United States Patent [19]

Miller et al.

[11] Patent Number: 5,444,551
[45] Date of Patent: * Aug. 22, 1995

[54] PROCESS FOR SPECIFYING MEAN-PRESERVING MUTLI-LEVEL HALFTONE MATRICES WITH VARYING AMOUNTS OF MODULATION

[75] Inventors: Rodney L. Miller, Fairport; Craig M. Smith, Rochester, both of N.Y.

[73] Assignee: Eastman Kodak Company, Rochester, N.Y.

[ * ] Notice: The portion of the term of this patent subsequent to Mar. 1, 2011 has been disclaimed.

[21] Appl. No.: 918,291

[22] Filed: Jul. 22, 1992

[51] Int. Cl.$^6$ ............................................. H04N 1/40
[52] U.S. Cl. .................... 358/456; 358/457; 358/460
[58] Field of Search ............... 358/75, 80, 456, 447, 358/448, 453, 462, 455, 443, 463, 461, 462, 433, 457, 460, 465, 298, 518, 517

[56] References Cited

U.S. PATENT DOCUMENTS

| | | | |
|---|---|---|---|
| 3,953,668 | 4/1976 | Judice | 178/6 |
| 4,736,254 | 4/1988 | Kotera et al. | 358/283 |
| 4,876,611 | 10/1989 | Fischer et al. | 358/456 |
| 4,891,714 | 1/1990 | Klees | 358/456 |
| 4,910,603 | 3/1990 | Hirahara et al. | 358/298 |
| 4,912,562 | 3/1990 | Femester et al. | 358/298 |
| 4,920,501 | 4/1990 | Sullivan et al. | 364/518 |
| 4,939,589 | 7/1990 | Fischer et al. | 358/448 |
| 4,951,159 | 8/1990 | Van Beek | 348/455 |
| 4,953,013 | 8/1990 | Tsuji et al. | 358/75 |
| 4,955,065 | 9/1990 | Ulichney | 382/50 |
| 4,956,638 | 9/1990 | Larky et al. | 340/701 |
| 4,992,955 | 2/1991 | Yabuuchi et al. | 364/518 |
| 5,014,138 | 5/1991 | Fischer et al. | 358/448 |
| 5,014,333 | 5/1991 | Miller et al. | 382/54 |
| 5,023,729 | 6/1991 | Kumagai | 358/457 |

(List continued on next page.)

FOREIGN PATENT DOCUMENTS 59-161183 4/1983 Japan .
60-26966 2/1985 Japan .
60-145767 8/1985 Japan .
5915466 1/1986 Japan .

(List continued on next page.)

OTHER PUBLICATIONS

Ulichney, "Digital Halftoning", pp. 71–171 (MIT Press, ©1987).
Onishi et al., "The MELFAS 850, A High-Speed Facsimile with a Half-Tone Reproduction Capability", Mitsubish Denki Giho; vol. 54, No. 8, pp. 46–49 (1980).

*Primary Examiner*—Paul Ip
*Attorney, Agent, or Firm*—Peyton C. Watkins

[57] ABSTRACT

Apparatus and a method for generating a multi-level halftone image (104) from a digitally sampled continuous tone (contone) image (101). The apparatus includes a control circuit (140), a preference matrix (150) having as its matrix elements addresses of a plurality of look-up tables (160) and a plurality of look-up tables (160) in the form of a look-up table stack (155). The control circuit instructs the preference matrix to select a specific look-up table from the look-up table stack in a pre-defined manner. The selected table is used to convert an intensity value (102) into each multi-level pixel value (106) in the halftone image. To accomplish the conversion, each look-up table contains a quantized one-dimensional transfer function (165') having as an input the magnitude of the intensity value. The transfer functions are automatically generated such that the sum of the derivatives of the transfer functions equals the number of pixel values in a halftone cell. The magnitude of each intensity value is mapped into an output level by the quantized transfer function as one of a plurality of available levels. The resulting output level is assigned a pixel location in a halftone cell (103). The look-up table selection is repeated for each element of the preference matrix such that the magnitude of each different intensity value in the contone image is mapped into a corresponding halftone cell to generate a complete multi-level halftone image.

22 Claims, 17 Drawing Sheets

U.S. PATENT DOCUMENTS

| | | | |
|---|---|---|---|
| 5,027,078 | 6/1991 | Fan | 358/456 |
| 5,031,050 | 7/1991 | Chan | 358/298 |
| 5,041,920 | 8/1991 | Hayes et al. | 358/456 |
| 5,050,000 | 9/1991 | Ng | 358/298 |
| 5,051,844 | 9/1991 | Sullivan | 358/456 |
| 5,053,866 | 10/1991 | Johnson | 358/75 |
| 5,070,413 | 12/1991 | Sullivan et al. | 358/456 |
| 5,172,267 | 12/1992 | Ghaderi | 358/456 |
| 5,291,311 | 3/1994 | Miller | 358/456 |
| 5,321,427 | 6/1994 | Agar et al. | 346/76 PH |
| 5,333,069 | 7/1994 | Spence | 358/517 |

FOREIGN PATENT DOCUMENTS

| | | |
|---|---|---|
| 62-289054 | 12/1987 | Japan . |
| 63-157558 | 6/1988 | Japan . |
| 63-316974 | 12/1988 | Japan . |
| 155771 | 6/1989 | Japan . |

FIG. 4

|   |   |   |    |
|---|---|---|----|
| 7 | 6 | 5 | 16 |
| 8 | 1 | 4 | 15 |
| 9 | 2 | 3 | 14 |
| 10| 11| 12| 13 |

|    |    |    |    |
|----|----|----|----|
| 1  | 9  | 3  | 11 |
| 13 | 5  | 15 | 7  |
| 4  | 12 | 2  | 10 |
| 16 | 8  | 14 | 6  |

|    |    |    |    |    |    |
|----|----|----|----|----|----|
| 16 | 15 | 14 | 5  | 4  | 3  |
| 17 | 18 | 13 | 6  | 1  | 2  |
| 10 | 11 | 12 | 7  | 8  | 9  |
| 5  | 4  | 3  | 16 | 15 | 14 |
| 6  | 1  | 2  | 17 | 18 | 13 |
| 7  | 8  | 9  | 10 | 11 | 12 |

150

$L_x > L_y$

PROCESS FOR SPECIFYING MEAN-PRESERVING MUTLI-LEVEL HALFTONE MATRICES WITH VARYING AMOUNTS OF MODULATION

CROSS-REFERENCE TO RELATED APPLICATION

This application describes material in U.S. application Ser. No. 07/906,142, filed Jun. 29, 1992, having Kodak Docket No. 63,006, entitled "Apparatus And Method For Generating Multi-Level Output Values For Pixels In A Halftone Cell" (now U.S. Pat. No. 5,291,311 issued Mar. 1, 1994).

TECHNICAL FIELD OF THE INVENTION

The invention relates to apparatus, and an accompanying method, for use in digital halftoning systems, and particularly, to a method and apparatus for generating modulation levels that can be used to produce multi-level halftone images.

BACKGROUND ART

Generally, digital halftoning is accomplished by either bi-tonal or multi-tonal halftoning methods. Bi-tonal halftoning is widely used in the art and is a basic digital halftoning method from which multi-tonal halftoning methods are derived. Therefore, bi-tonal digital halftoning is discussed below as a precursor to a discussion of multi-tonal halftoning.

In general, bi-tonal digital halftoning converts a continuous tone image into a halftone image consisting of a pattern of equal intensity dots. Each dot within the halftone image either exists (black) or does not exist (white), i.e., a bi-tonal image. More specifically, bi-tonal digital halftoning converts a plurality of digitized intensity values representing a continuous tone image into a plurality of halftone cells, where each halftone cell corresponds to each intensity value. Moreover, the number of dots within each halftone cell is proportional to the magnitude of each corresponding intensity value. The intensity values are typically generated by periodically sampling a continuous tone image using an optical scanner. Each intensity value represents the image intensity in an immediate area surrounding the location within the continuous tone image from which an intensity value sample was taken. Typically, each intensity value is quantized into a plurality of levels known as gray scale levels. Quantization permits each intensity value to be represented by a digital value and processed by digital circuitry into a halftone image. For instance, if the intensity value is quantized into 256 levels, i.e., a 256 level gray scale, the intensity value can be represented by an eight-bit digital word.

During bi-tonal digital halftoning, each intensity value is spatially mapped into a corresponding halftone cell. As noted above, each halftone cell typically encompasses a plurality of pixels, each having a bi-tonal value, i.e., either black or white. However, some applications require the number of intensity values to equal the number of pixels in the halftone cell, i.e., equal scanner and halftone resolutions. Generally speaking, regardless of the application, the arrangement of bi-tonal pixels within the halftone image is perceived by a viewer of the halftone image to have a gray scale intensity commensurate with the magnitude of each associated intensity value. The above described mapping process is generally known as spatial modulation.

In operation, a bi-tonal digital halftoning system compares each intensity value sample to a matrix of modulation levels and generates a halftone cell corresponding to each intensity value. Typically, this matrix has a number of elements equivalent to the number of pixels in the halftone cell. To generate the bi-tonal halftone cell, a given intensity value is compared to each modulation level in the matrix. Each pixel in the halftone cell, that corresponds to a modulation level in the modulation level matrix and is lesser in value than the intensity value, is made black; otherwise, the pixel is white. Thus, the intensity value is mapped into an area comprised of an arrangement of black and white pixels whose overall intensity is commensurate with the magnitude of the intensity value.

The arrangement of modulation levels within the modulation level matrix is generally known as dithering, more specifically, in two common forms: clustered dot dithering and dispersed dot dithering. In essence, through dithering, the modulation levels are arranged to ensure that the resultant halftone pixels that will be generated for a given cell will accurately reflect the intensity of the input intensity value associated with that cell. For a detailed discussion of dithering in bi-tonal systems, see Ulichney, *Digital Halftoning*, pp. 71–171 (MIT Press, ©1987).

The matrix comparison process, as described above, is repeated for each intensity value sampled from the original continuous tone image. As a result, the entire image is spatially modulated into a halftone image comprised of a tile-like arrangement of halftone cells each representing a different corresponding intensity value sample.

As is well known in the art, the halftoning process thus far described is useful in halftoning color images by repeating the bi-tonal process for each primary color, i.e., red, blue, and green or cyan, magenta, and yellow, and, subsequently, overlaying the resulting color halftone images with proper registration.

Multi-level halftoning is an extension of bi-tonal halftoning. As its name implies, multi-level halftoning replaces each black or white pixel in a bi-tonal halftone cell with a pixel having a value selected from a number of values available for each pixel. In essence, multi-level halftoning redistributes the intensity of a single intensity value into a plurality of intensity values within a halftone cell. Many display devices permit multi-level pixel display; multi-level halftoning takes advantage of this capability. For example, thermal printers are capable of printing dot sizes that correspond to each pixel intensity level. Additionally, cathode ray tube (CRT) displays can display various pixel intensities by altering an electron beam strength incident upon each pixel within the CRT display.

Typically, display devices are limited as to the number of levels that they can display. In contrast, sampling devices can produce many different output levels. Therefore, multi-level halftoning is used to convert a large number of output levels from a sampling device into a lesser number of levels compatible with a display device. For instance, if a display device can accurately display five levels while a scanner can provide a 256 level intensity value, a multi-level halftoning system must distribute each single 256 level value into a halftone cell, containing a plurality of five level pixels, that, when viewed, appears as the 256 level value.

To determine the appropriate level for each pixel in a multi-level halftone cell, an input intensity value is compared to a number of modulation level matrices, i.e., N−1 matrices are used to generate N levels. Generally, the comparison process is similar to that used in bi-tonal halftoning except the comparison process is repeated N−1 times for N−1 matrices. As in bi-tonal halftoning, each matrix contains, as matrix elements, a number of different modulation levels. The number of matrix elements is equivalent to the number of pixels in the halftone cell. The output of each comparison is a digital bit, i.e., a signal having a value of either a logical "1" or logical "0". The output bit value indicates whether the intensity value is greater than the modulation level, i.e., logical "1" or less than the modulation level, i.e., logical "0". Each output bit is stored in an intermediate matrix. Thus, a set of N intermediate matrices containing digital bits is generated. An encoder combines the elements of the intermediate matrices to generate the pixel values for a halftone cell.

For example, an intensity value may be quantized by an 8-bit scanner to have a value between 0 and 255. The intensity value is compared to four matrices. Each matrix contains modulation levels arranged in a 4-by-4 matrix having various modulation levels ranging from 0 to 255. Comparing each modulation level in each matrix to the intensity value results in four intermediate matrices containing digital values. The elements of each intermediate matrix are valued at a logical "1" whenever the intensity value is larger than the corresponding modulation level; otherwise, a logical "0" is used as the matrix element. In essence, the four intermediate matrices are four bi-tonal halftone cells. The elements of each intermediate matrix having the same coordinates are combined to form a 4-bit word. Each 4-bit word is then encoded to generate a halftone output value for a pixel in the multi-level halftone cell. The resulting pixel value will range from 0 to 4, i.e., one level for each modulation level matrix with one level to signify the absence of a pixel.

As in the case of bi-tonal halftoning, the modulation levels are placed in a dither pattern within each modulation level matrix. The dither patterns used are essentially the same as those used in bi-tonal halftoning, i.e., clustered-dot dither or dispersed-dot dither.

Currently, the modulation levels in each matrix of a multi-level halftoning system are generated manually. These levels are then arranged using empirical methods to achieve a desired intensity value to halftone cell conversion. The number of modulation levels that needs to be specified is $(m \times n)(N-1)$, where: N is the number of desired output levels, and m and n are the dimensions in matrix elements of the modulation level matrices. In practice, the number of modulation levels that must be generated can be quite large. For example, a system having 12 output levels with 8-by-8 element matrices requires that 64 modulation levels must be specified and then properly arranged in each of 11 modulation level matrices.

Moreover, to accomplish each intensity value comparison, N−1 comparator circuits associated with N−1 modulation level matrices are necessary to produce an N-level output. Thus, a conventional multi-level halftone system requires a dedicated number of comparators and associated matrices to generate each of the output levels. Consequently, each halftoning system must be designed to accommodate a specific number of output levels to drive a specific display device. Thus, a single multi-level halftone image generating system cannot be readily altered to accommodate any number of output levels and hence is rather inflexible.

Therefore, a specific need exists in the art for apparatus that generates multi-level output values for pixels in a halftone cell in a manner which readily accommodates any number of output levels. Specifically, a need exists in the art for apparatus that generates multi-level values without using an arrangement of comparators and modulation level matrices. Additionally, a need exists in the art for apparatus that automatically generates modulation levels for each of the modulation level matrices.

SUMMARY OF THE INVENTION

Accordingly, an object of the present invention is to provide apparatus for performing multi-level halftoning of a continuous tone image.

A specific object of the present invention is to generate multi-level pixels in a halftone cell without using a matrix and comparator combination.

Another specific object of the present invention is to automatically generate modulation levels for modulation level matrices used to perform multi-level halftoning.

These and other objects are accomplished in accordance with the teachings of the present invention by apparatus for generating a multi-level halftone image using a look-up table selection technique operating in conjunction with a method of automatically generating modulation levels as elements in a plurality of look-up tables. In particular, the apparatus includes a control circuit, a preference matrix having, as its matrix elements, addresses of a plurality of look-up tables, and a plurality of look-up tables in the form of a look-up table stack. Generally, the control circuit instructs the preference matrix to select a look-up table from the look-up table stack. The selected table is used to convert an intensity value into a multi-level pixel value. Specifically, the control circuit provides the preference matrix with an address of an element within the preference matrix. The value of the chosen element selects a look-up table from the stack. Subsequently, the chosen look-up table is used to convert an intensity value into a pixel value in a halftone cell. To accomplish the conversion, each look-up table contains a one-dimensional quantized transfer function having, as an input, the magnitude of the intensity value. Each transfer function is automatically derived using a mean-preserving algorithm such that the sum of the derivatives of all of the transfer functions is equivalent to the number of pixels in the halftone cell. Through the transfer function, the intensity value magnitude is mapped into one of a plurality of available output levels. The resulting output level is assigned a pixel location in the halftone cell. The look-up table selection is repeated for each element of the preference matrix so that the magnitude of each intensity value is mapped into the halftone cell. As successive intensity values are processed, halftone cells are generated and appropriately positioned such that a halftone image is generated by arranging successive halftone cells in a tile-like pattern.

BRIEF DESCRIPTION OF THE DRAWINGS

The teachings of the present invention may be readily understood by considering the following detailed description in conjunction with the accompanying drawings, in which:

FIG. 4 depicts an example of a preference matrix for producing a clustered-dot dither;

FIG. 5 depicts an example of a preference matrix for producing a dispersed-dot dither;

FIG. 6 depicts an example of a preference matrix for simultaneously producing two clustered-dot dithers;

To facilitate understanding, identical reference numerals have been used, where possible, to denote identical elements that are common to various figures.

DETAILED DESCRIPTION OF THE INVENTION

Figure 1:
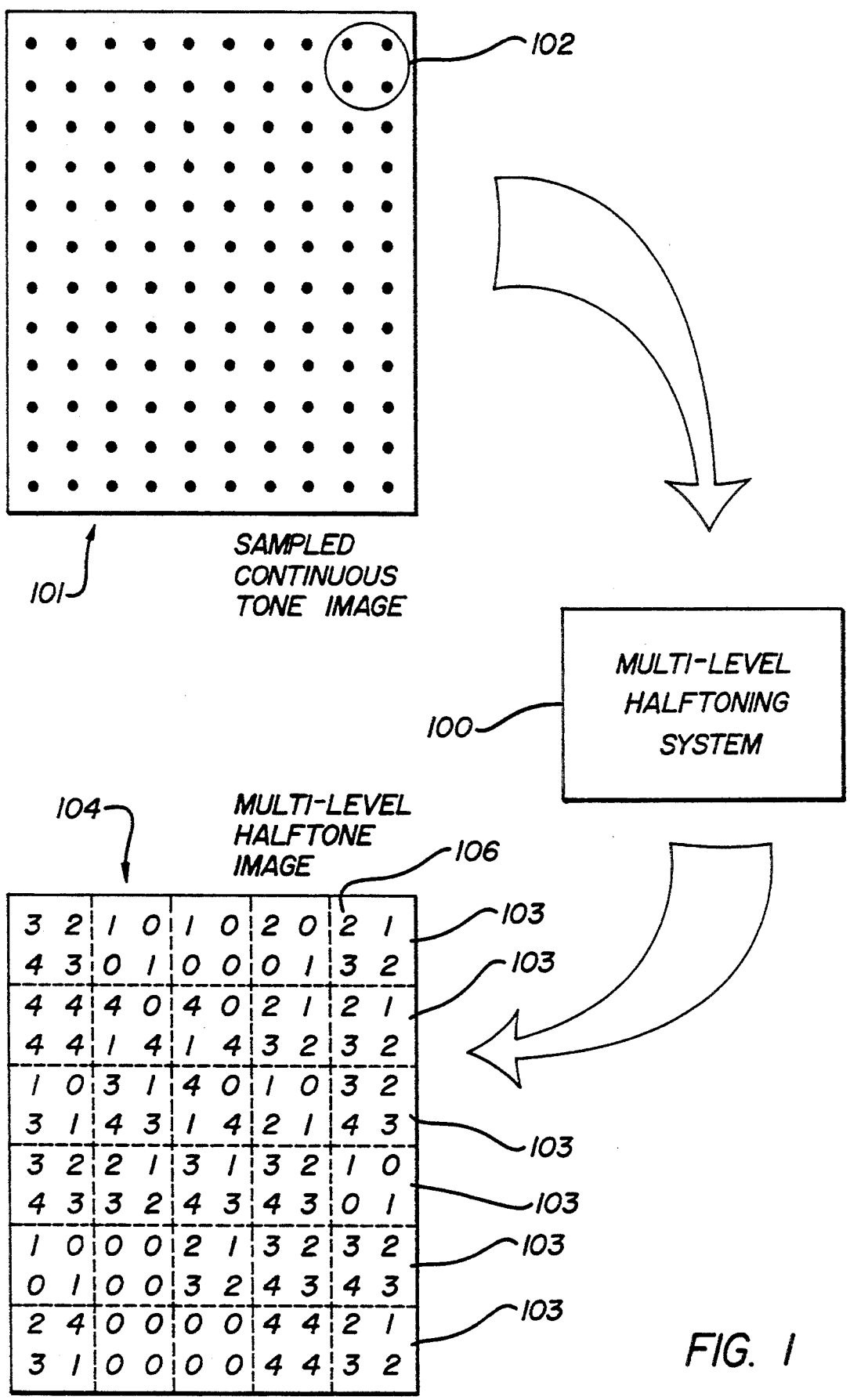
FIG. 1 depicts a block diagram of a system for generating halftone images.

FIG. 1 depicts a high level block diagram of a system for generating multi-level halftone images in accordance with the teachings of the invention. Generally, system 100 converts intensity values 102 of original continuous tone image 101 into halftone cells 103 that collectively comprise halftone image 104. The conversion is accomplished by a preference matrix, within system 100, through which one of a plurality of one-dimensional transfer functions is selected to convert intensity values 102 into pixel values 106. Specifically, intensity values 102 are illustratively converted for cell 103 in the upper-right hand location in halftone image 104 into corresponding pixel values "2", "1", "3", and "2". For ease of reference, each individual pixel value will be referred to hereinafter as pixel value 106.

More specifically, each intensity value 102 is generated by periodically sampling continuous tone image 101, quantizing each resulting intensity value sample, generating a digital intensity value representing each such intensity value sample, and storing the digital intensity value in memory for future retrieval. The outcome of the intensity value generation process is a digital number representing the image intensity in an area surrounding the sample location. Typically, the intensity value generating process is accomplished by an image scanner or computer graphics generating software. For purposes of the present invention, the particular source of the intensity values is irrelevant and hence will not be discussed further.

System 100 converts each intensity value 102 into pixel value 106. Thus, at each intensity value location in original image 101, a pixel value 106 is located in halftone image 104. Cells 103 are positioned in a tile-like arrangement to produce a complete halftone rendition of original continuous tone image 101. In accordance with one aspect of the invention, each pixel value 106 in halftone cell 103 has a multi-level value. As illustratively depicted, each intensity value 102 is mapped into one of four pixels in a 2-by-2 halftone cell 103, where each pixel has one of five levels ranging from 0 to 4.

Figure 2:
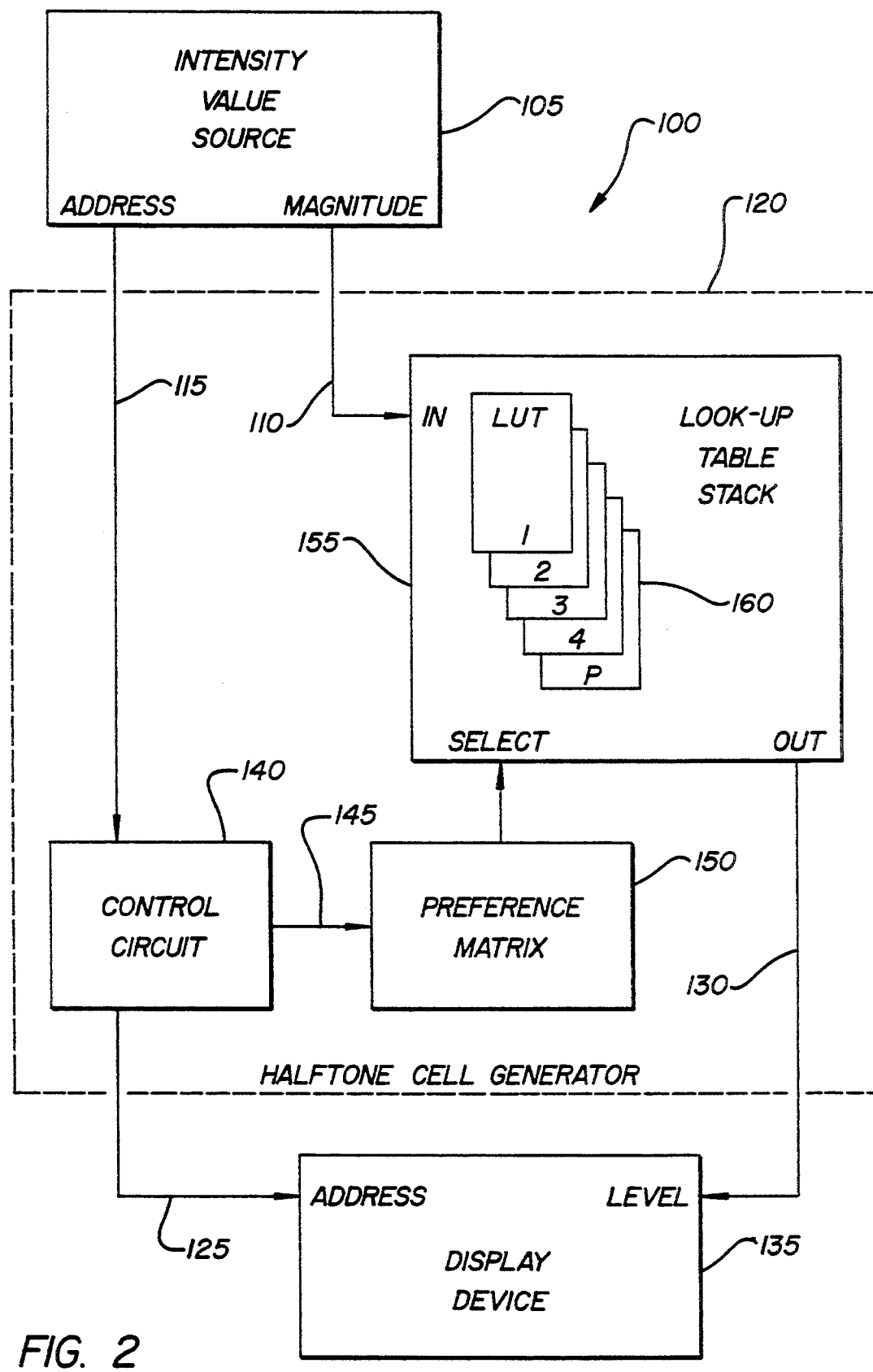
FIG. 2 depicts a detailed block diagram of an embodiment of a system for generating halftone images in accordance with the teachings of the present invention.

FIG. 2 depicts a detailed block diagram of the present invention as it is used in system 100 to generate halftone images. Generally, halftone cell generator 120 converts intensity values provided by intensity value source 105 into multi-level halftone pixel values for display on display device 135. Specifically, intensity value source 105 provides, via lines 110 and 115, an intensity value magnitude and location address to halftone cell generator 120. The intensity values are processed, into a corresponding halftone cell pixel value, by the halftone cell generator in the order in which the intensity values are received, i.e., serially. The address and level of each pixel in the halftone cell is transferred, via lines 125 and 130, to display device 135, such as a cathode ray tube (CRT) monitor or printer.

Halftone cell generator 120 contains look-up table stack 155, preference matrix 150 and control circuit 140. In operation, control circuit 140, in response to an intensity value address, selects a matrix element in preference matrix 150. Subsequently, the value contained at the chosen matrix element selects a specific look-up table from look-up tables 160 situated within stack 155. Each look-up table contains a quantized transfer function that maps the magnitude of the intensity value into a discrete output level, specifically, a halftone cell pixel value for subsequent display on display device 135.

Figure 3:
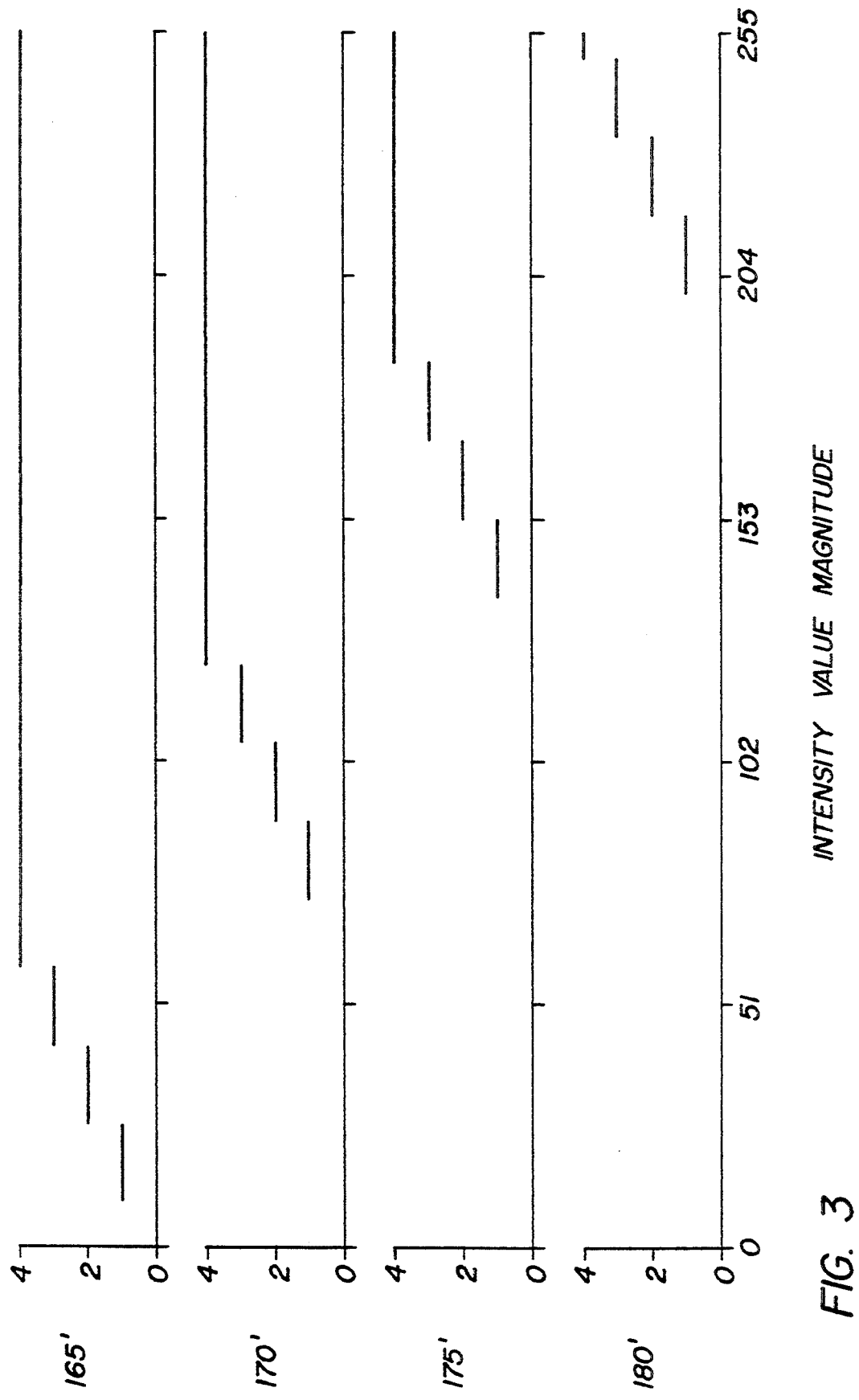
FIG. 3 depicts a set of four high-modulation transfer functions each quantized to produce one of five output levels in response to the magnitude of an intensity value.

For example, FIG. 3 depicts a set of four transfer functions 165', 170', 175', 180' quantized into five levels. The general shape of each transfer function 165', 170', 175', 180' is a quantized linear ramp function. The process, by which the transfer functions are generated, and the significance of the transfer function shape are discussed below. For now, it is sufficient to understand that for each intensity value magnitude applied to a given transfer function, a corresponding output level will be generated. For instance, an intensity value of 80 produces a level "4" from function 165', a level "1" from function 170', and a level "0" each from functions 175' and 180'. Subsequently, each level is used as a pixel value in a multi-level halftone cell. Thus, for a given intensity value, the pixel in a halftone cell can be filled with a multi-level value by selecting an appropriate transfer function.

These four quantized transfer functions 165', 170', 175', 180' are stored in look-up table stack 155, specifically shown in FIG. 2 as containing look-up tables 160. Preferably, look-up table stack 155 and preference matrix 150 are stored in random access memory (RAM). As such, look-up tables 160 and preference matrix 150 can be easily reprogrammed to conform to any specific application requirements. Each table 165, 170, 175 and 180 is generally stored as a one dimensional matrix, i.e., $1 \times N$, where N is the number of quantization levels.

The appropriate table within tables 160 that will be used to generate a particular halftone cell pixel value is determined by control circuit 140 and preference matrix 150. Control circuit 140 is generally implemented as a standard microprocessor while preference matrix 150 is stored in RAM. Functionally, control circuit 140 ensures that for each intensity value address a halftone cell pixel address is generated such that the halftone cells form a tile-like pattern in the halftone image. The halftone cell pixel addresses are transferred, via line 125, to display device 135 to facilitate proper alignment of the cells in the display.

In operation, control circuit 140 accesses, via line 145, the address of each element in preference matrix 150. The specific process by which the elements are selected is discussed below in connection with FIG. 7. Preference matrix 150, shown in FIG. 2, defines the size, i.e., the number of pixels, and shape of the halftone cell. Typically, preference matrix 150 has either a rectangular or hexagonal shape. Additionally, the address of each element in the preference matrix corresponds to a pixel location in the halftone cell. The number of elements in preference matrix 150, and hence in the halftone cell, is generally unlimited. Nonetheless, in practice, preference matrix 150 typically contains the same number of elements as there are look-up tables in look-up table stack 155. Illustratively then, each preference matrix element contains a value 1, 2, 3, 4, . . . , P each of which corresponds to an individual table within look-up tables 160. Once each such element is addressed by control circuit 140, the resulting look-up table corresponding to the value of that element is then used in converting the present intensity value into a multi-level halftone pixel value.

The arrangement of the values in preference matrix 150 generally follows well known pixel arrangements that are used in dither matrices to generate bi-tonal halftone cells. Generally, a dither matrix can be of any size as long as a constraint $\alpha P = mn$ is fulfilled; where $\alpha$ is an integer, P is the number of look-up tables 160, and m and n define the number of elements in the preference matrix. Typically, either clustered-dot dither or dispersed-dot dither are used. An example of a preference matrix using a clustered-dot dither format having an $\alpha$ of "1" is depicted in FIG. 4. Generally, the first pixel is near the center of the matrix with subsequent pixels being numbered in a spiral pattern radiating towards the outer most pixels, i.e., forming a cluster. An example of a preference matrix using a dispersed-dot dither format having an $\alpha$ of "1" is depicted in FIG. 5. Here, the pixels are dispersed throughout the matrix in an orderly manner. Alternatively, the elements of a dither matrix can address one or more of the look-up tables more than once. For example, a preference matrix which addresses each look-up table twice having a dual clustered-dot dither format and having an $\alpha$ of "2" is depicted in FIG. 6. For an in-depth discussion of the form and function of dither matrices, see Ulichney, *Digital Halftoning*, pp. 77–171 (MIT Press, ©1987).

Figure 7:
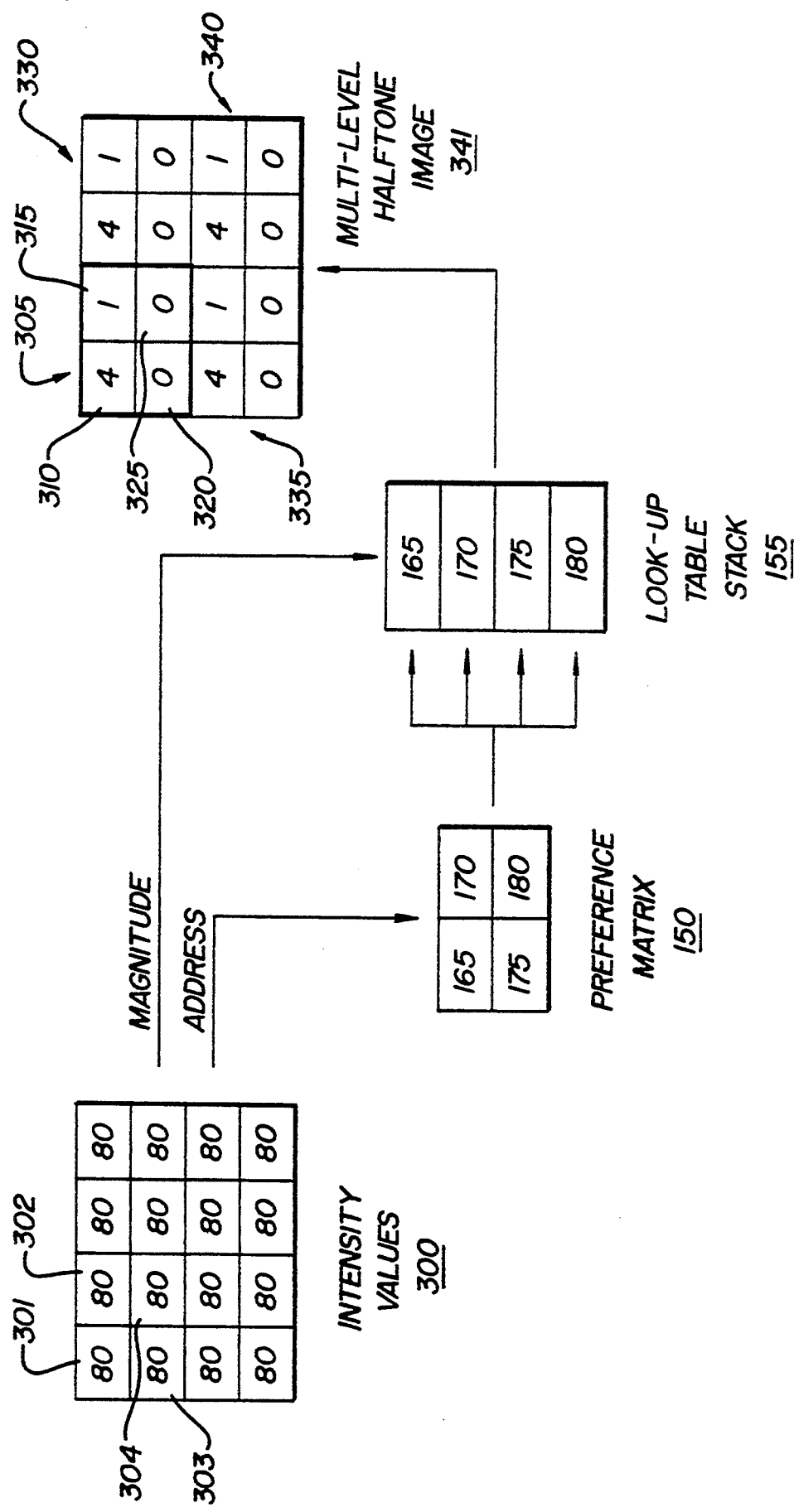
FIG. 7 depicts, in accordance with the teachings of the invention, a flow diagram of a preferred embodiment of my inventive process by which each intensity value is converted into a single pixel value in a multi-level halftone cell using the transfer functions shown in FIG. 3.

FIG. 7 depicts a flow diagram of a preferred embodiment of my inventive multi-level halftoning process. In general, intensity values 300 are converted, by a selected look-up table, into a pixel value in multi-level halftone image 341. To better explain the operation of the diagram, all intensity values 300 throughout the input area shown illustratively have a quantized value of "80" out of a possible 256 levels, i.e., depict a constant intensity throughout the area.

In operation, for each intensity value within values 300, control circuit 140 (not explicitly shown in FIG. 7) causes preference matrix 150 to select one of four tables 165, 170, 175 and 180. Specifically, control circuit 140 selects preference matrix elements in the same order, i.e., 165, 170, 175 and 180, for each group of four intensity values 300. Thus, when the intensity values are constant, a repetitive pattern of halftone cell pixel values is generated. To accurately accomplish the conversion process, control circuit 140 uses the location address of each intensity value to generate a location address of a corresponding pixel value within the halftone cell. Typically, the location of a given intensity value within the continuous tone image corresponds directly to a location of a pixel value in the halftone image generated from the given intensity value. However, in some halftoning system applications, the halftone image may be a scaled and/or rotated version of the continuous tone image. Thus, control circuit 140 would generate scaled or rotated coordinates for the pixel value locations relative to the corresponding intensity value locations.

In response to the magnitude of each one of intensity values 300, the selected table generates a pixel value for a pixel location in halftone cell 305 (shown as a dashed rectangle). For example, specific intensity value 301 having a value of "80" generates a "4" as an output of selected table 165 (transfer function 165' in FIG. 3). The level "4" is placed in halftone cell 305 shown in FIG. 7 at pixel location 310. Similarly, the output of table 170, i.e., here a "1", derived from intensity value 302 is placed in location 315, the output of table 175, i.e., here a "0", derived from intensity value 303 is placed in location 320, and the output of table 180, i.e., here a "0", derived from intensity value 304 is placed in location 325. These four pixels locations 310, 315, 320 and 325 comprise single halftone cell 305.

Subsequently, the remaining intensity values are processed in a similar manner to generate pixel values for remaining halftone cells 330, 335 and 340. The combination of halftone cells 305, 330, 335 and 340 generate halftone image 341 representative of the continuous tone image area from which the intensity values 300 were sampled.

Figure 8:
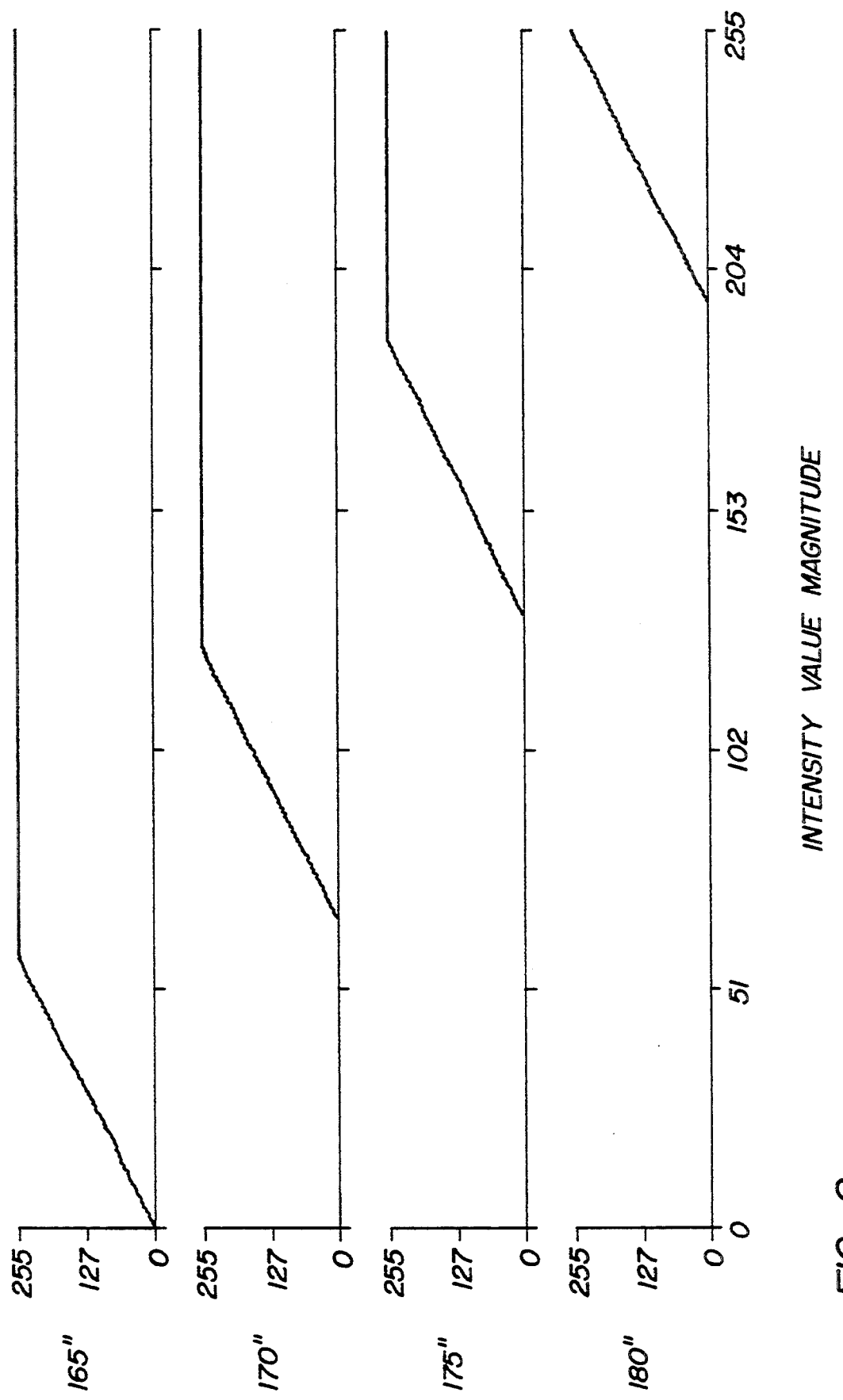
FIG. 8 depicts a set of four high-modulation transfer functions each quantized to produce one of 256 output levels in response to the magnitude of an intensity value.

The foregoing multi-level halftoning examples used one of five levels as halftone cell pixel values. However, those skilled in the art will recognize that any number of levels can be generated merely by quantizing the transfer functions into a greater number of levels. For example, FIG. 8 depicts linear transfer functions 165", 170", 175", 180" having 256 quantization levels. Transfer functions 165", 170", 175", 180" can be stored as look-up tables 165, 170, 175 and 180 in lieu of the transfer functions shown in FIG. 3. As compared to the transfer functions shown in FIG. 3, transfer functions 165", 170", 175" and 180" shown in FIG. 8 provide an increased number of output levels, i.e., 256 levels versus 5 levels.

Figure 9:
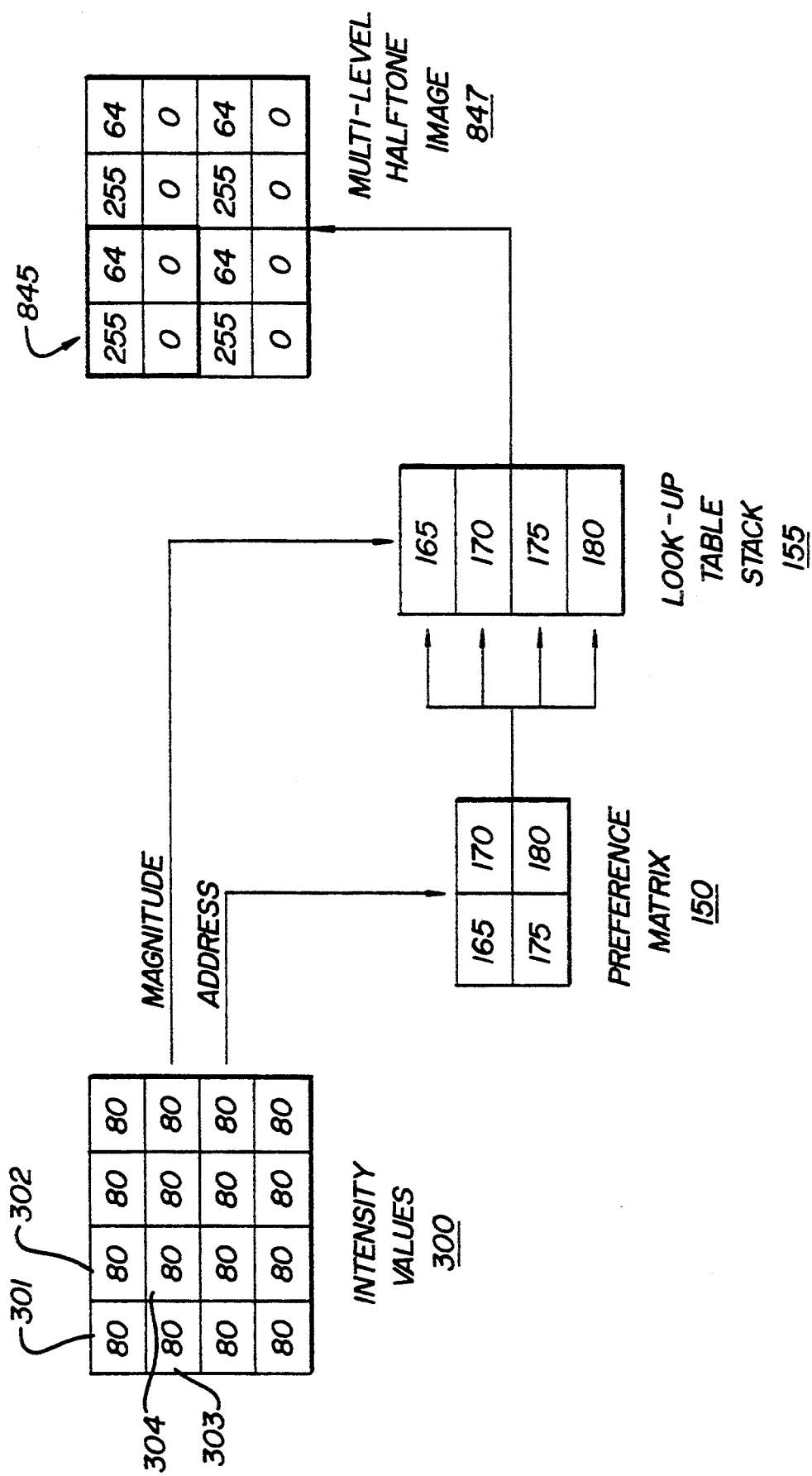
FIG. 9 depicts a flow diagram showing another embodiment of my inventive process by which each intensity value is converted into a single pixel value in a multi-level halftone cell using the transfer functions shown in FIG. 8.

FIG. 9 depicts, in accordance with another embodiment of my invention, a flow diagram for a multi-level halftoning process using transfer functions 165", 170", 175" and 180" of FIG. 8. Look-up tables 165, 170, 175 and 180 are simply reprogrammed to store corresponding transfer functions 165", 170", 175" and 180" in tabular form. Generally, operation of the invention is substantially similar to the operation of previous embodiment. However, the increased quantization levels cause each value within intensity values 300 to be mapped into four pixels that can each have a value ranging from 0 to 255. In particular, when, as shown, each intensity value has a value of "80", the output of look-up table 165 is "255", the output of table 170 is "64", and the outputs of tables 175 and 180 are both "0". The halftone image resulting from sixteen intensity values having a value of "80" is shown as multi-level halftone image 847.

The manner in which the halftone cells are filled with multi-level pixel values is regulated by both the arrangement of elements in the preference matrix and the shape of the transfer functions stored in the look-up tables selected by the preference matrix. As discussed previously, the elements in the preference matrix are typically arranged in either a traditional clustered-dot or dispersed-dot dithering pattern. The pattern of matrix elements defines which look-up table will be used to generate a multi-level pixel value at a specific location in the halftone cell, while the shape of the transfer functions stored in each look-up table controls the manner through which each individual pixel value is determined.

For example, as the magnitudes of the intensity values are incrementally increased from a value of "0" towards a value of "255", the transfer functions depicted in FIGS. 3 and 8 generate a halftone cell by initially producing an incrementally increasing multi-level pixel value with functions 165' or 165". The outputs of all the other transfer functions initially remain at "0". As the intensity values continue to increase, function 165' produces a maximum pixel value of "4" before function 170' produces a pixel value greater than "0". Similarly, as the intensity values increase, function 165" produces a maximum pixel value of "255" before functions 170" produces a pixel value greater than "0". More specifically, in FIG. 7, as intensity values 300 increase in magnitude, pixel 310 of halftone cell 305 obtains a maximum value of "4" before pixel 315 obtains a value of "1". Similarly, as the magnitudes of intensity values 300 increase further, the value of pixel 315 increases to a maximum value of "4" before the value of pixel 320 begins to increase. This characteristic is indicative of high-modulation halftoning. Thus FIGS. 3 and 8 depict illustrative high-modulation halftoning transfer functions. Alternatively, the transfer functions can overlap, such that, as the intensity values increase in magnitude, a second pixel in the halftone cell starts to increase in value prior to any of the other pixels in the halftone cell attaining a full value.

Figure 10:
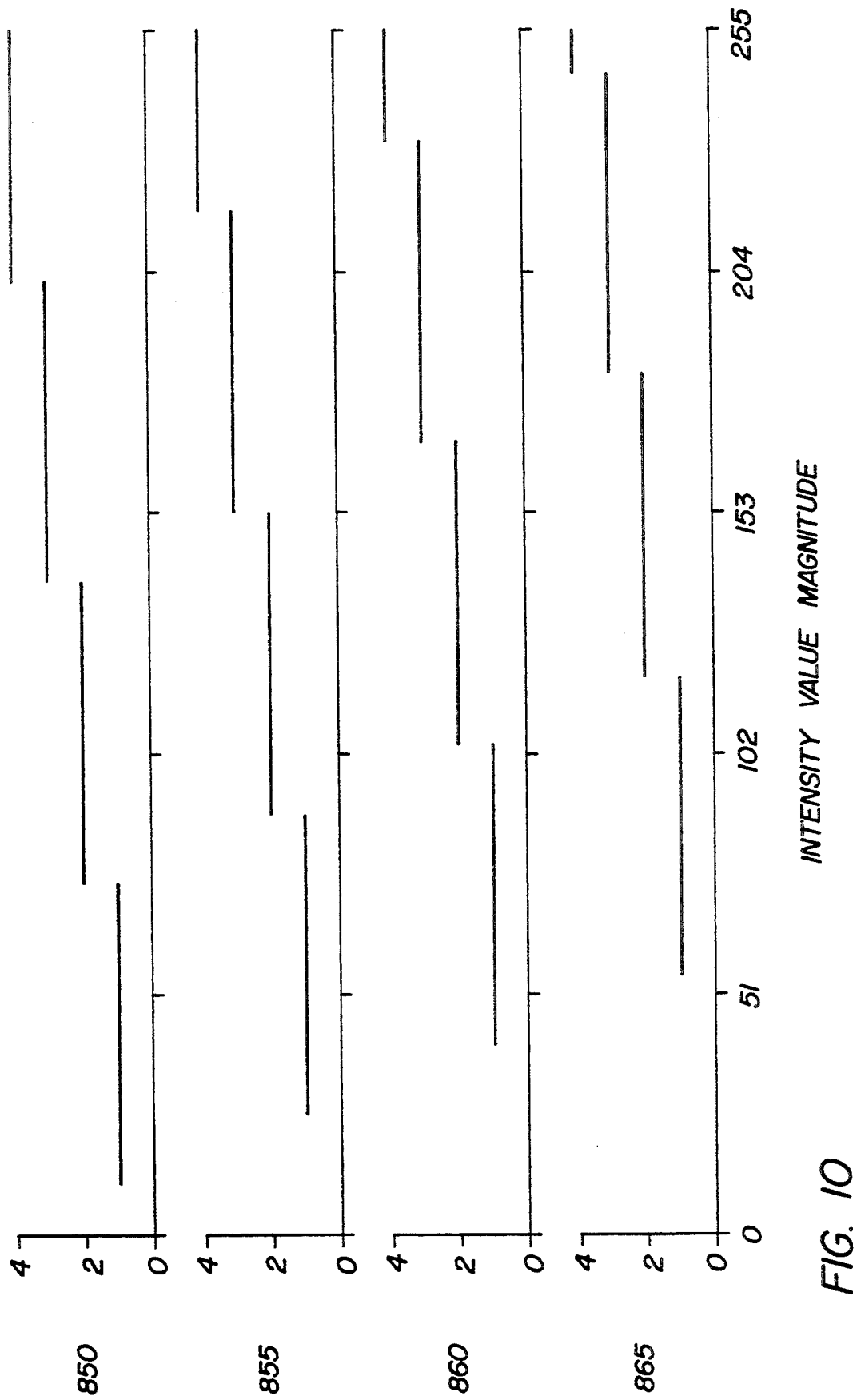
FIG. 10 depicts a set of four low-modulation transfer functions each quantized to produce one of five output levels in response to the magnitude of an intensity value.

In contrast to the high-modulation halftoning transfer functions, FIG. 10 depicts low-modulation halftoning transfer functions. Here, transfer functions 850, 855, 860 and 865 ensure that, as the intensity values increase, all the pixels in a halftone cell attain the same value prior to increasing any one pixel value above the value of its neighboring pixels.

Figure 11:
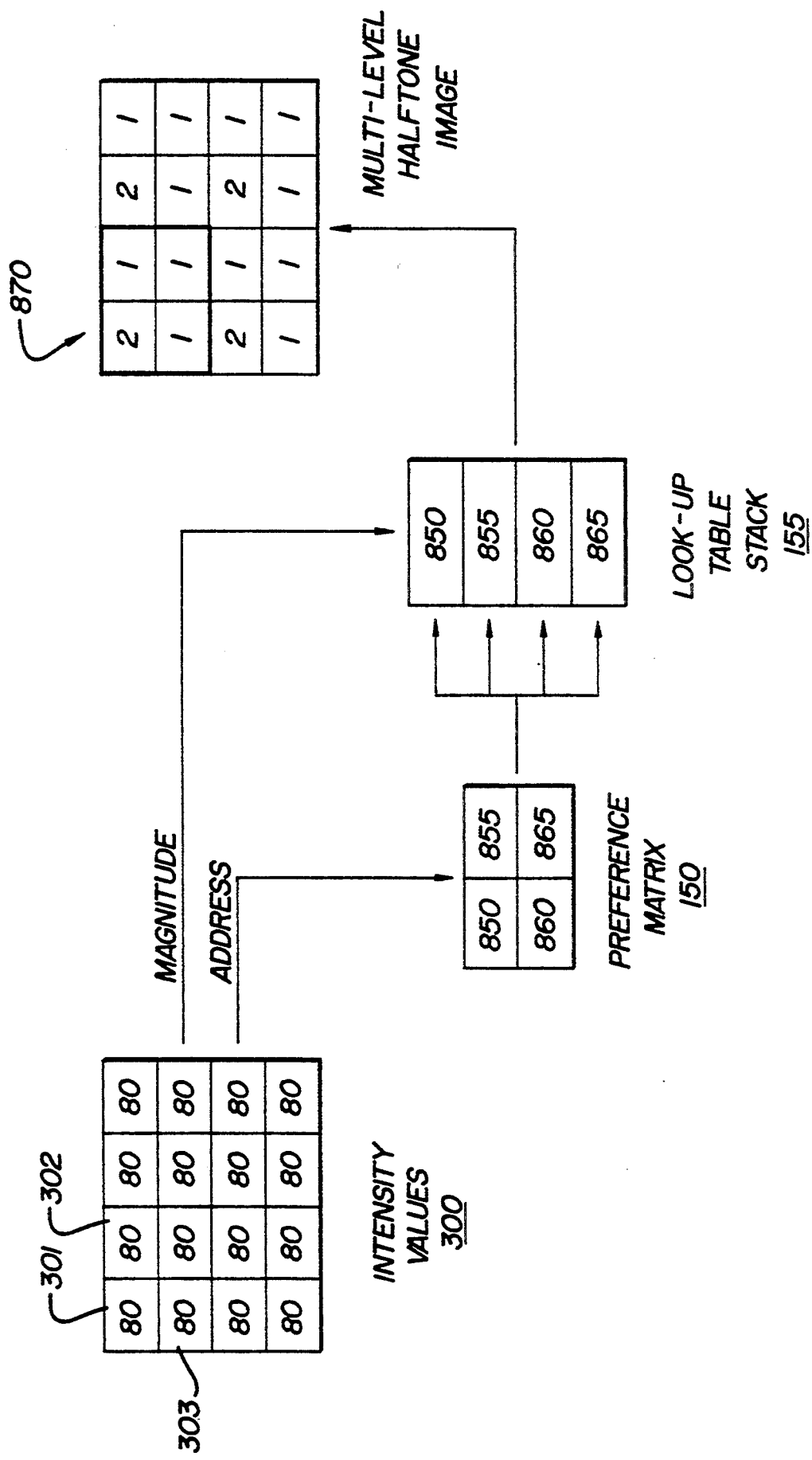
FIG. 11 depicts a flow diagram of another embodiment of my inventive process by which each intensity value is converted into a single pixel value in a multi-level halftone cell using the transfer functions shown in FIG. 10.

FIG. 11 depicts a flow diagram of my inventive multi-level halftoning process using low-modulation transfer functions 850, 855, 860 and 865 of FIG. 10. As depicted in FIG. 11, as intensity values 300 increase in magnitude, all the pixels in halftone cell 870 must attain the same value prior to an increase in value of any one of these pixels. Of course, as with the functions shown in FIG. 3, any number of quantization levels may be used as defined by a specific application.

In each of the embodiments of the invention, the transfer functions are generated using the following rule: the sum of the derivatives of the transfer functions must equal the number of pixels in the halftone cell. This rule is derived as follows.

Figure 12:
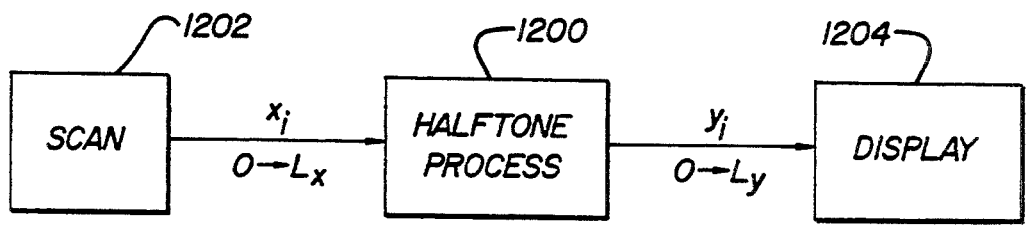
FIG. 12 depicts a simplified block diagram of a halftone imaging system.

As depicted in FIG. 12, a multi-level halftone imaging system can be characterized as a function, represented by block 1200, which operates on intensity values, $x_i$, which range in value from 0 to $L_x$, and produces halftone cell pixel values, $y_i$, having values ranging from 0 to $L_y$, where $L_x > L_y$. Intensity values, $x_i$, are produced by scanner 1202, while the halftone cell pixel values, $y_i$, are displayed on display device 1204. In accordance with an aspect of the present invention, a mean-preserving constraint that forms the basis of the transfer function generation rule is applied to the halftoning process. The mean-preserving constraint is stated through equation (1) as follows:

$$R \xrightarrow{\lim} \infty \frac{1}{R} \sum_i^R \frac{x_i}{L_x} = R \xrightarrow{\lim} \infty \frac{1}{R} \sum_i^R \frac{y_i}{L_y} \quad (1)$$

where: R indicates a number of pixels contained in an arbitrary two-dimensional region of pixels. Equation (1) requires that for a given infinitely large region having an infinite number of pixels, the average normalized output of the halftoning process will equal the average normalized input, i.e., be mean preserving. Of course, in any practical application, the size of region R is limited to a finite number of pixels. Unfortunately, limiting the region to contain a finite number of pixels, R, introduces a quantization error, $\xi_{qR}$, as shown in equation (2), below:

$$\frac{1}{R} \sum_i^R \frac{x_i}{L_x} = \frac{1}{R} \sum_i^R \frac{y_i}{L_y} + \epsilon_{qR} \qquad (2)$$

As equation (2) indicates, for finite regions, the mean-preserving constraint is optimized when the global quantization error, $\xi_{qR}$, is minimized.

The global quantization error, $\xi_{qR}$, arises from quantizing the individual pixel values and positioning the quantized values in a finite number of pixel locations. Therefore, the global quantization error, $\xi_{qR}$, representing the quantization error throughout region R is equivalent to the average of the pixel value quantization errors, $\xi_{qi}$, within region R, as dictated by equation (3):

$$\epsilon_{qR} = \frac{1}{R} \sum_i^R \epsilon_{qi} \qquad (3)$$

For infinitely large regions, the average of the pixel value quantization errors becomes vanishingly small, as indicated by equation (4):

$$R \xrightarrow{\lim} \infty \; \epsilon_{qR} = R \xrightarrow{\lim} \infty \; \frac{1}{R} \sum_i^R \epsilon_{qi} \approx 0 \qquad (4)$$

Hence, there is not a quantization error term in equation (1).

Continuing the derivation by substituting equation (3) into equation (2), equation (2) reduces to equation (5) as follows:

$$\frac{1}{R} \sum_i^R \frac{x_i}{L_x} = \frac{1}{R} \sum_i^R \frac{y_i}{L_y} + \frac{1}{R} \sum_i^R \epsilon_{qi} = \frac{1}{R} \sum_i^R \left( \frac{y_i}{L_y} + \epsilon_{qi} \right) \qquad (5)$$

Further manipulation of equation (5) is best explained in conjunction with a detailed block diagram of halftone process 1200.

Figure 13:
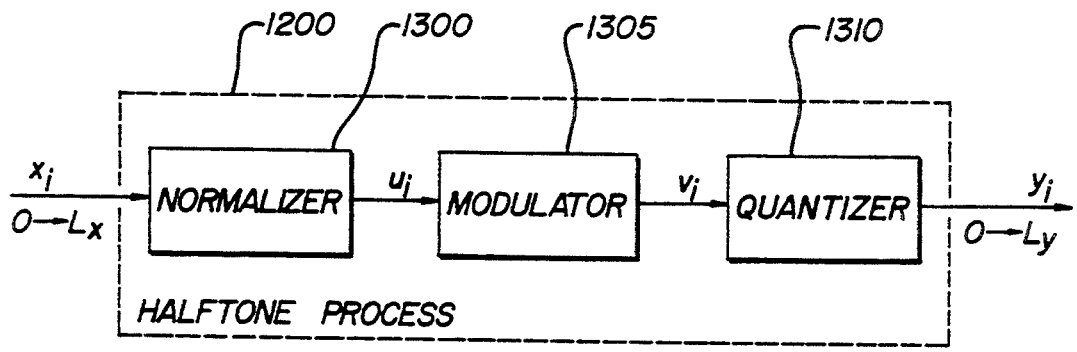
FIG. 13 depicts a detailed block diagram of a halftoning process.

FIG. 13 depicts a block diagram of multi-level halftone process 1200, shown in FIG. 12, comprising normalizer 1300, modulator 1305 and uniform quantizer 1310, all being serially connected. In general, these blocks perform the basic functions of a multi-level halftone system. Specifically, normalizer 1300 converts the input intensity values into values between 0 and 1. Subsequently, modulator 1305 maps the normalized intensity values into pixel values using a set of transfer functions. Lastly, each pixel value is quantized by quantizer 1310 into one of a plurality of levels, $L_y+1$, prior to placement in a plurality of halftone cell pixel locations. To further simplify equation (5) and, ultimately, define an equation for generating the transfer functions used by modulator 1305, a mathematical description of each functional block 1300, 1305, and 1310 is provided as follows.

The input intensity value, $x_i$, is related to normalizer 1300 output signal, $u_i$, by equation (6) as follows:

$$\frac{x_i}{L_x} = u_i \qquad (6)$$

where: $0 \leq u_i \leq 1$. Similarly, the input signal, $v_i$, to quantizer 1310 is related to the halftone pixel value, $y_i$, by equation (7) as follows:

$$\frac{y_i}{L_y} + \epsilon_{qi} = v_i \qquad (7)$$

where $\xi_{qR}$ is the global quantization error and $0 \leq v_i \leq 1$.

Substituting equation (6) and (7) into equation (5) results in equation (8):

$$\frac{1}{R} \sum_i^R u_i = \frac{1}{R} \sum_i^R v_i \qquad (8)$$

However, while the substitution of equation (7) into equation (5) is useful for enabling the derivation to proceed independent of the number of quantization levels and disregarding the quantization error, it may result in solutions for the variable $v_i$ which do not minimize the global quantization error. These errant solutions generally arise when the quantization error is most apparent, such as solutions used to generate very low-modulation and no-modulation transfer functions.

Equation (8) is further simplified by assuming that the input value, $u_i$, is constant within the input region. Thus, $u_i$ is equal to u, for all i within input region R. Under this constraint, equation (8) becomes:

$$u = \frac{1}{R} \sum_i^R v_i \qquad (9)$$

To effectively generate pixel values for a halftone cell having P pixels, modulator 1305 must modulate with a period P. Additionally, the mean preserving constraint only needs to be applied over an integer number of halftone cells comprising a halftone image. Thus, R=bP, where b is an integer. Now, assuming b=1, i.e., to solve equation (9) for a single halftone cell, equation (9) reduces to equation (10) as follows:

$$u = \frac{1}{P} \sum_i^P v_i(u) \qquad (10)$$

Consequently, each normalized pixel value in the output halftone cell is a one-dimensional function of input variable u, i.e., a normalized intensity value. In other words, each pixel in the output halftone cell is determined using a one-dimensional transfer function operating upon the input intensity value. Thus, a mathematical representation of the operation of modulator 1305 has been derived.

Equation (10) leads to a simple criteria for designing the transfer functions $v_i(\;)$. Differentiating both sides of equation (10) with respect to u results in equation (11):

$$P = \sum_i^P \frac{dv_i}{du} \qquad (11)$$

Equation (11) shows that a set of transfer functions, $v_i(\;)$, satisfying the mean-preserving criteria, exist, for all values of u, if the sum of the derivatives of the set of functions equals the number of pixels in the halftone cell. This concept is best understood in connection with a number of examples.

Figure 14:
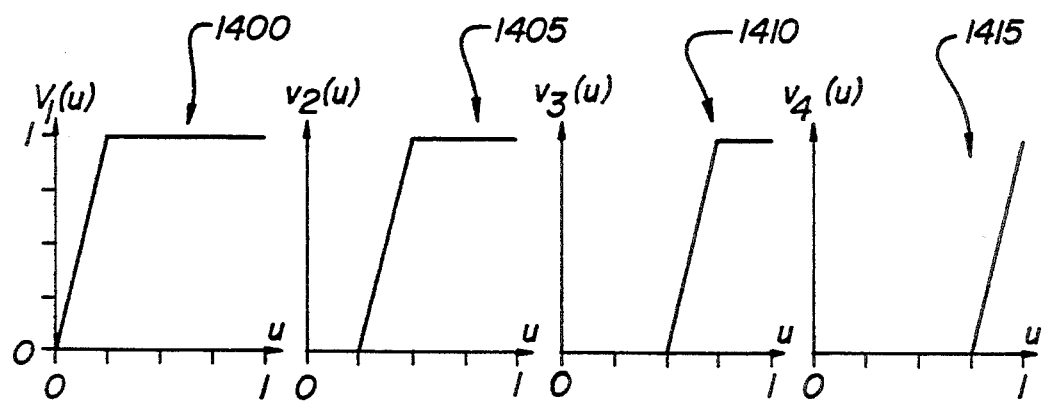
FIG. 14 depicts four normalized high-modulation transfer functions.
Figure 15:
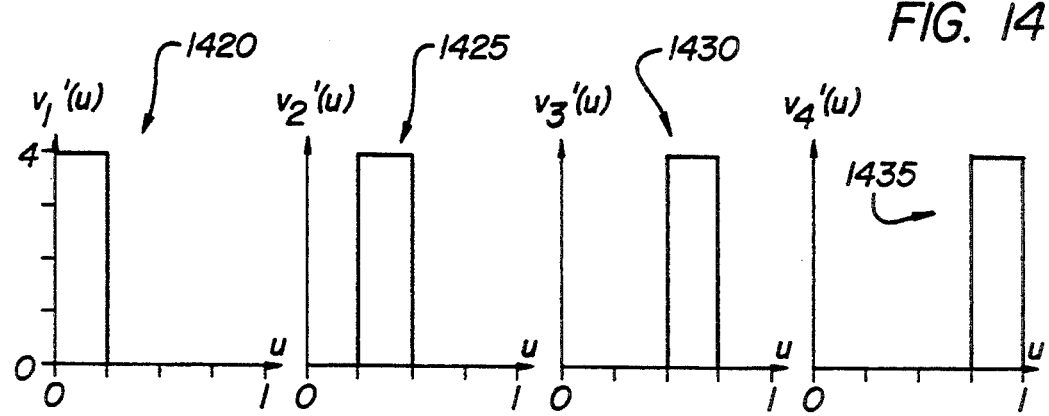
FIG. 15 depicts four functions which are derivatives of the transfer functions shown in FIG. 14.
Figure 16:
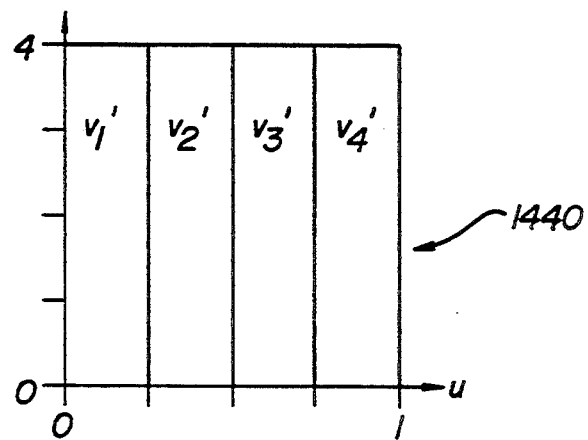
FIG. 16 depicts a graph of a summation of the derivative functions shown in FIG. 15.

FIG. 14 depicts transfer functions 1400, 1405, 1410 and 1415 which satisfy equation (11) when P=4, i.e., the number of elements in the halftone cell is four. Corresponding derivative functions 1420, 1425, 1430 and 1435 of each of the transfer functions of FIG. 14 are depicted in FIG. 15. Additionally, FIG. 16 depicts the summation of derivative functions 1420, 1425, 1430 and 1435 in single graph 1440. As expected, the accumulated derivative functions sum to a value of four for all values of u. The sum is equivalent to the number of elements in the halftone cell. Transfer functions 1400, 1405, 1410 and 1415 depicted in FIG. 14 are a normalized version of the high-modulation transfer functions depicted in FIG. 3. Thus, FIG. 16 depicts a graphical representation of equation (11) for high-modulation.

Figure 17:
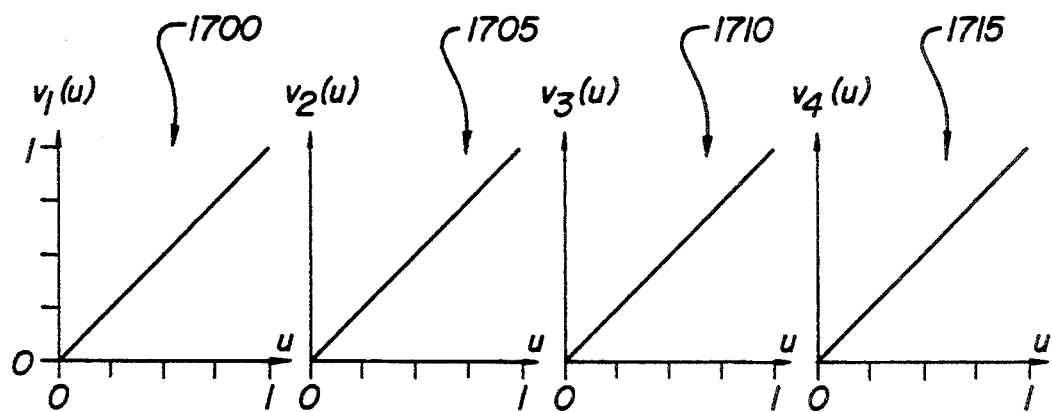
FIG. 17 depicts four normalized no-modulation transfer functions.
Figure 18:
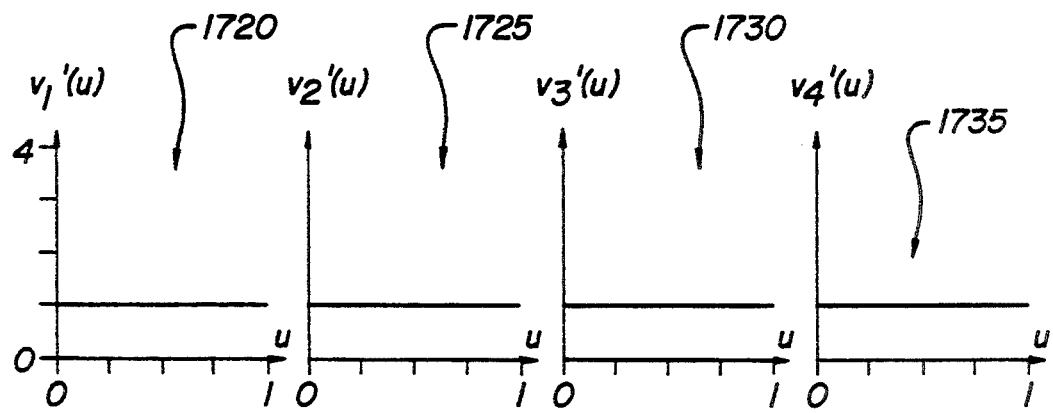
FIG. 18 depicts four functions which are derivatives of the transfer functions shown in FIG. 17.
Figure 19:
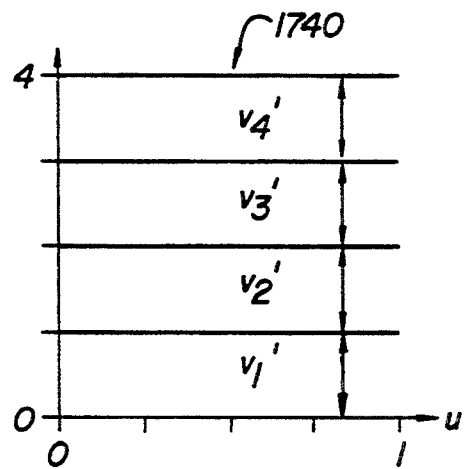
FIG. 19 depicts a graph of a summation of the derivative functions shown in FIG. 18.

In contrast, FIG. 17 depicts no-modulation transfer functions 1700, 1705, 1710 and 1715 with FIG. 18 depicting the corresponding derivative functions 1720, 1725, 1730 and 1735, respectively. FIG. 19 depicts in graph 1740 a summation of derivative functions 1720, 1725, 1730 and 1735. Generally, modulation is a measure of the difference amongst pixel values given a fixed input, having a constant value, over the entire halftone cell region. The four smooth transfer functions of FIG. 17 generate identical pixel values in the halftone cell given a smooth region of input intensity values. Additionally, as the intensity values uniformly increase in magnitude, the pixel values also uniformly increase in magnitude. Thus, no modulation will be evident. However, when the transfer functions are quantized into L-levels, the quantization error generates modulation. Generally, as represented in equation (2), whenever transfer functions are quantized, an amount of modulation is generated which is directly associated with quantization error. Thus, no-modulation is transformed into low-modulation by the quantization error. The quantized transfer functions for low-modulation are depicted in FIG. 9.

To define a meaningful constraint equation useful for generating predictable modulation levels, modulation caused by quantization should be separated from that caused by the transfer functions. Therefore, the amount of modulation generated solely by the transfer functions is denoted by a texture variable, t, which varies from 0 to 1. The transfer functions depicted in FIG. 14 have a texture of 1, i.e., high-modulation; and those depicted in FIG. 17 have a texture of 0, i.e., no-modulation. Accordingly, the transfer functions are hereinafter interpreted as two-dimensional functions, i.e., $v_i(u,t)$. Consequently, equation (11) becomes equation (12) as follows:

$$P = \sum_i \frac{d}{du} v_i(u,t) \quad (12)$$

Thus, given a texture and a specific number of halftone cell pixels, a set of P one-dimensional transfer functions can be defined. The chosen texture value directly controls the amount of modulation generated by the transfer functions represented in the halftone cell.

Figure 20A:
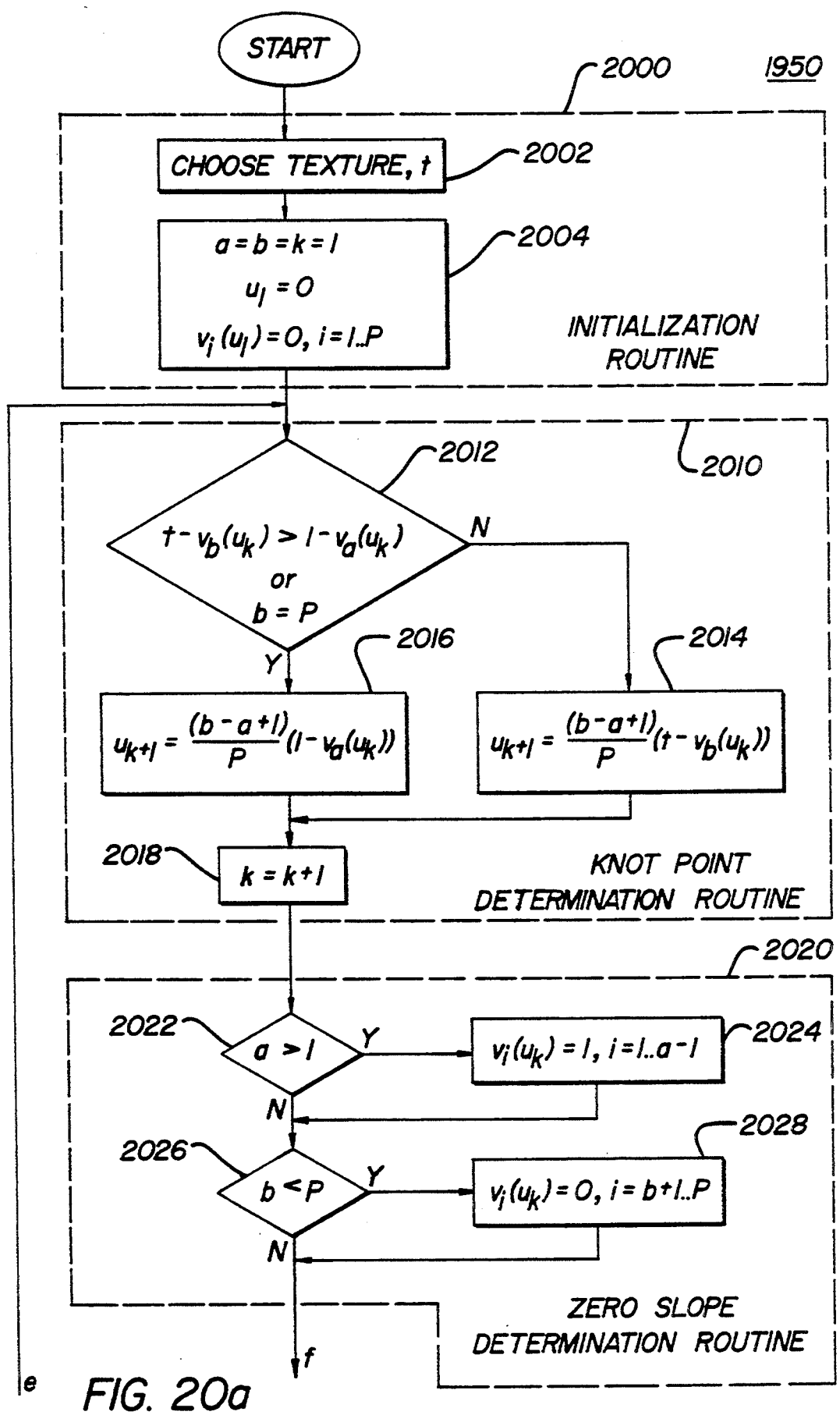
FIG. 20 depicts a flow chart of my inventive process for generating transfer functions such as those shown in FIGS. 3, 8, 10, 17, 21, 24 and 27.
Figure 20B:
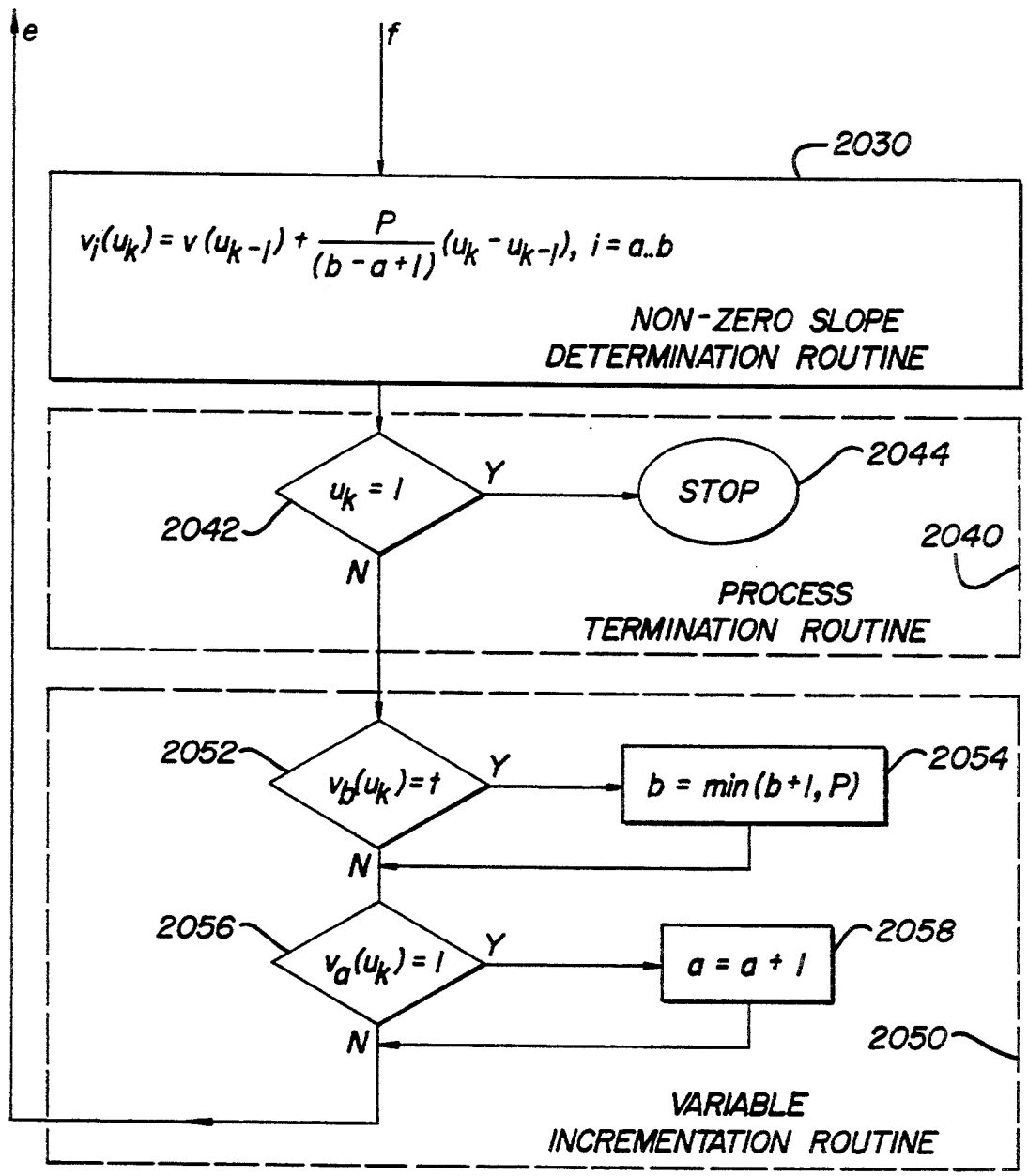

FIG. 20 depicts a flow chart of inventive process 1950 for determining a set of transfer functions given a halftone cell size and a texture value. Generally, process 1950 develops P transfer functions in a piece-wise linear fashion. More specifically, a number of knot points are determined and then connected to one another to form a set of piece-wise linear functions. Each knot point defines a point on each function where the slope of the function changes. Additionally, each knot point is defined by values of u and v for each function. Simply stated, process 1950 determines each knot point by increasing input variable u to determine each point where the slope of the transfer function must change to fulfill the requirements of equation (12). When a knot point $u_k$ is determined on one transfer function, the value of all the other transfer functions at the knot point value are determined. In this manner, all the knot points for all the transfer functions are generated as u is increased from 0 to 1.

To fulfill the requirements of equation (12), the summation of the derivative functions, i.e., the sum of the slopes of all the transfer functions, must equal P, the total number of transfer functions forming a transfer function set. At any given point in the transfer function set, only transfer functions having non-zero slopes contribute to the summation of the derivative functions. Clearly, slopes of zero produce a derivative function equaling zero and hence do not contribute to the summation. Therefore, the slope of a given transfer function between any two knot points is a linear function given by equation (13) as follows:

$$\text{slope} = \frac{P}{m} \quad (13)$$

where: m is the number of transfer functions with non-zero slopes between two given knot points.

In general, each transfer function generated by process 1950 has three portions: a first portion with a slope of zero and generating an output value of zero for all input values, a second portion with a non-zero slope, and a third portion with a slope of zero and generating an output value of one for all input values. Process 1950 determines the value of $u_i$ and $v_i$ at each knot point, k, for each transfer function. At each knot point, a value is determined for each transfer function, i. Thus, at a given knot point location, $(u_k, v_i)$, on a given transfer function, i, the other functions in the set may have knot points at locations: $(u_k, 0)$, first portion; $(u_k, 1)$, third portion; or $(u_k, v_l)$, second portion, where $v_l$ is a transfer function output value different from $v_i$. For example, if four transfer functions are to be determined, i.e., P=4, the process must determine for each knot point $u_k$, four transfer function values corresponding to $u_k$, i.e., four values of $v_i(u_k)$. Subsequently, at knot point $u_{k+1}$, four more transfer function values are determined. After all the knot points and their corresponding values on each transfer function are determined, the values at each knot point for each transfer function are connected in a piece-wise linear fashion. To simplify matters, the values u and v can be viewed as knot point coordinates within the u-v plane, where the u-v plane is defined having u as the abscissa and v as the ordinate.

Now, specifically as to process 1950 itself. Upon commencing process 1950, variable initialization occurs in block 2000. Once all the variables are initialized, knot point $u_k$ is determined in block 2010. Using the knot point, each function $v_i$ having a zero slope at knot point $u_k$ is determined in block 2020. Subsequently, the value $v_i(u_k)$ of each transfer function having a non-zero slope at knot point $u_k$ is determined in block 2030. After all the knot point values are determined for a specific knot point, block 2040 determines whether all of the knot point locations have been determined for all the transfer functions in the set. Lastly, the computation variables are updated in block 2050 before the process continues at a point prior to block 2010 to determine the next knot point.

Specifically, block 2000, which forms an initialization routine, queries a human operator, at step 2002, to select texture value t as a variable ranging from 0 to 1, where 0 will cause the process to generate transfer functions with no modulation and 1 will cause the process to generate transfer functions with high modulation. Additionally, the operator is queried as to the size of halftone cell desired, measured in pixels, P. The variable P controls the number of transfer functions the process will generate. Consequently, each transfer function generated is provided an indicator, i, ranging from the values 1 to P.

Step 2004 initializes various variables. Specifically, knot point index k is set to 1. Additionally, variable a, which varies from 1 to P and identifies the transfer function with the smallest indicator i and a non-zero slope, and variable b, which varies from 1 to P and identifies the transfer function with the largest indicator i and a non-zero slope, are both initialized to 1. Initializing a and b to unity thus establishes that only the first transfer function will have a non-zero slope, i.e., a slope having a value P, at the first knot point. The first knot point location value $u_1$ is initialized to 0, as are all the transfer function values, i.e., knot point location values $v_i$ for all i ranging from 1 to P. Thus, in the u-v plane, after initialization all the transfer functions have a value, $v_i$, of zero while u=0. At the (0,0) point, the first transfer function must have a slope of P to satisfy equation (13).

Next knot point location, $u_{k+1}$, is then determined by the routine in block 2010. The next knot point is located at the smallest value of u at which either $v_a=1$ or $v_b=t$. Specifically, determination of the knot point is accomplished at step 2012 by subtracting $v_a(u_k)$ from 1 and subtracting $v_b(u_k)$ from t. The smaller difference indicates whether $v_a=1$ or $v_b=t$, respectively, occurs at a smaller value of u. Based upon whichever occurred at the smaller value of u, that value of u, specifically $u_{k+1}$, is computed at either step 2014 or 2016. Subsequently, at step 2018, the value of the knot index k is increased by 1.

The transfer function values $v_i$ for each function that has a slope of zero at the knot point location $u_{k+1}$ must be set to either 0 or 1, i.e., to generate first and third portions of the transfer functions. The routine shown contained in block 2020 accomplishes this function. As previously stated, each transfer function is identified by a variable i ranging from 1 to P. Variable a indicates the transfer function with the smallest indicator i having a non-zero slope at the current knot point. All the transfer functions with smaller indicators fulfilling the inequality $i<a$ are set to a value of 1, i.e., $v_i(u_k)=1$ for all i=1 to a−1. This function is applied whenever a is greater than 1. Accordingly, step 2022 determines if a is greater than 1; step 2024 sets all the transfer functions having a smaller indicator i than a to 1.

In contrast, variable b indicates the transfer function with the largest indicator i having a non-zero slope at the current knot point. All the transfer functions with larger indicators fulfilling the inequality $i>b$ are set to a value of 0, i.e., $v_i(u_k)=0$ for all i=b+1 to P. This function is applied whenever b is less than P. Accordingly, step 2026 determines if b is less than P and step 2028 sets all the transfer functions having a larger indicator i than b to 0.

Step 2030 determines the values, vi, of the transfer functions having non-zero slopes at knot point location $u_k$. Since all the transfer functions at the current knot point having indicators i within the range $a>i>b$ have been set to 0 or 1 by the routine in block 2020, all transfer functions having indicators in the range $a \leq i \leq b$ are deemed to have a non-zero slope. The value of each transfer function at present knot point $u_k$ meeting the forgoing criterion is computed by equation (14) as follows:

$$v_i(u_k) = v_i(u_{k-1}) + \frac{P}{(b - a + 1)} (u_k - u_{k-1}), i = a \text{ to } b \quad (14)$$

where: $v_i(u_k)$ are the values of the transfer functions at present knot point $u_k$, and $v_i(u_k)$ are the values of the transfer functions at previous knot point $u_{k-1}$. Note that k had been incremented by 1 at step 2018, thus the values of $u_{k+1}$ computed at steps 2016 or 2014 correspond to the values of $v_i(u_k)$ computed at step 2030. Thus, the location of each knot point in the second portion of each transfer function is defined by the coordinates $u_{k+1}$ and $v_i(u_k)$ in the u-v plane.

The process termination routine shown in block 2040 determines whether all of the transfer functions have been defined. If so, process 1950 terminates. Since the normalized input variable u varies from 0 to 1, an accurate indicator of whether all the knot points have been determined occurs when $u_k$ attains the value of 1. Accordingly, at step 2042, the process queries as to whether $u_k=1$. If the answer is YES, the process is stopped at step 2044. If the answer is NO, the process continues with block 2050.

The variable incrementation routine shown in block 2050 increments the variables a and b depending on the current value of the transfer function having an indicator equal to a and the current value of the transfer function having an indicator equal to b. Specifically, at step 2052, the process queries whether the value of the transfer function having the largest indicator i and a non-zero slope, i.e., i=b, is equivalent to texture value t. If the answer is YES, the value of b is set, at step 2054, to the minimum of either b+1 or P. If the answer is NO, the value of b is unchanged and the process continues on to step 2056.

At step 2056, the process queries whether the value of the transfer function having the smallest indicator i and a non-zero slope, i.e., i=a, is equivalent to 1, i.e., the largest value of v possible. If the answer is YES, the value of a is set, at step 2058, to a+1. If the answer is NO, the value of a is unchanged and the process continues on to block 2010.

By repeating the process until stopped at step 2044, the knot points of a full set of P transfer functions are generated. By connecting knot points $u_k$ of each transfer function $v_i$ in a piece-wise linear fashion, a set of transfer functions are produced. Subsequently, in accordance with the teachings of the present invention, the transfer functions can be quantized into $L_y+1$ levels and stored as look-up tables for use in the halftoning process previously discussed.

To further understand the operation of the process for generating transfer functions, FIGS. 21-29 each depicts a set of eight transfer functions, their cumulative derivatives and an illustrative number of pixel values that result from applying an increasing intensity value to each of the eight transfer functions.

Figure 23:
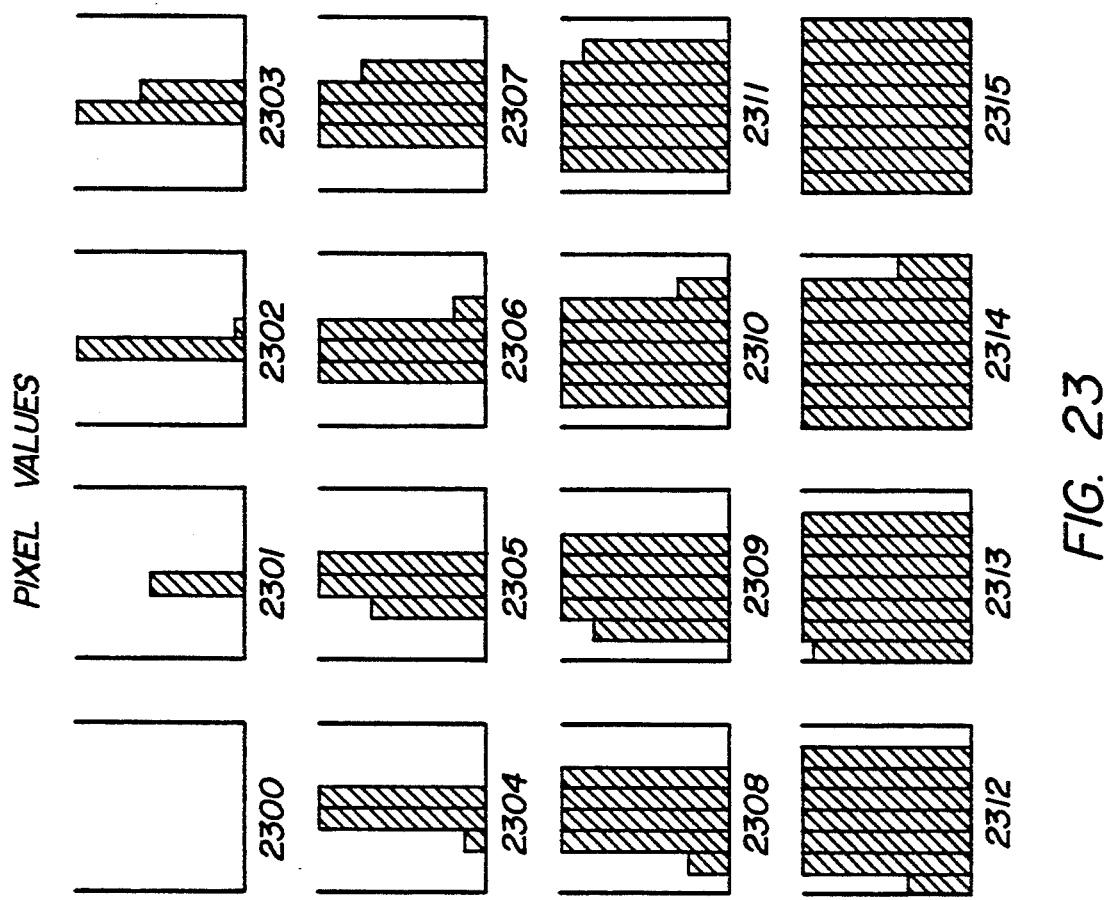
FIG. 23 depicts halftone cell pixel values that result from using the transfer functions shown in FIG. 21 in a halftoning system such as that shown in FIG. 2.
Figure 21:
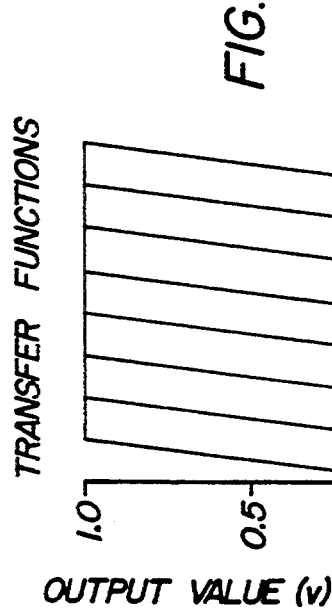
FIG. 21 depicts eight high-modulation transfer functions generated by the process shown in FIG. 20 using variables $P=8$ and $t=1.00$.
Figure 22:
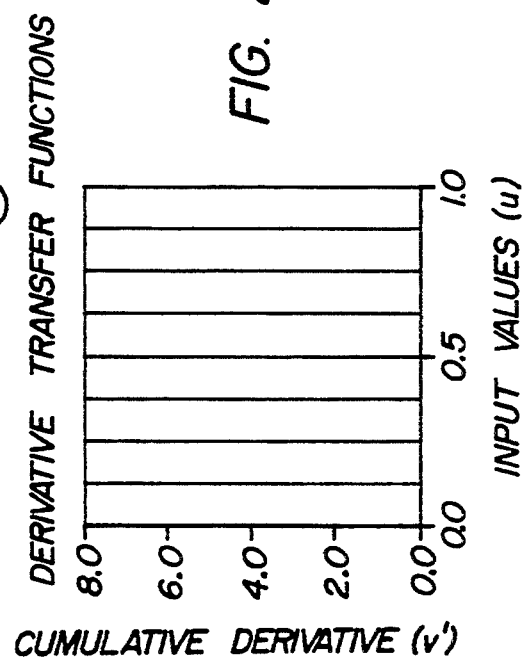
FIG. 22 depicts a graph of a summation of the derivatives of the transfer functions shown in FIG. 21.

Specifically, FIG. 21 depicts a set of transfer functions generated in accordance with the inventive process. To produce the illustrative transfer function, the input variables were initialized as follows: P=8 and t=1.00, i.e., high-modulation. As depicted in FIG. 22, the cumulative derivative sums to a value of eight for all u. FIG. 23 depicts output values of the transfer functions, i.e., halftone cell pixel values, as the input intensity values are increased from a normalized value of 0 to 1 in increments of 1/16. In this instance, the preference matrix, a 1-by-8 matrix, addresses each transfer function in a clustered dot dither pattern. Specifically, if each of the eight transfer functions is consecutively numbered from 1 to 8 and if the elements of the 1-by-8 preference matrix are consecutively numbered from 1 to 8, then preference matrix elements 1-8 are respectfully addressed to transfer functions 7, 5, 3, 1, 2, 4, 6 and 8. Under this configuration, as the intensity value increases, the output generated by element 4 addressing transfer function 1 increases. The increasing output value occurs until a maximum value is obtained. Subsequently, the output generated by element 5 addressing transfer function 2 increases in value. As the intensity value increases, more and more output pixels are generated with a non-zero value.

Figure 26:
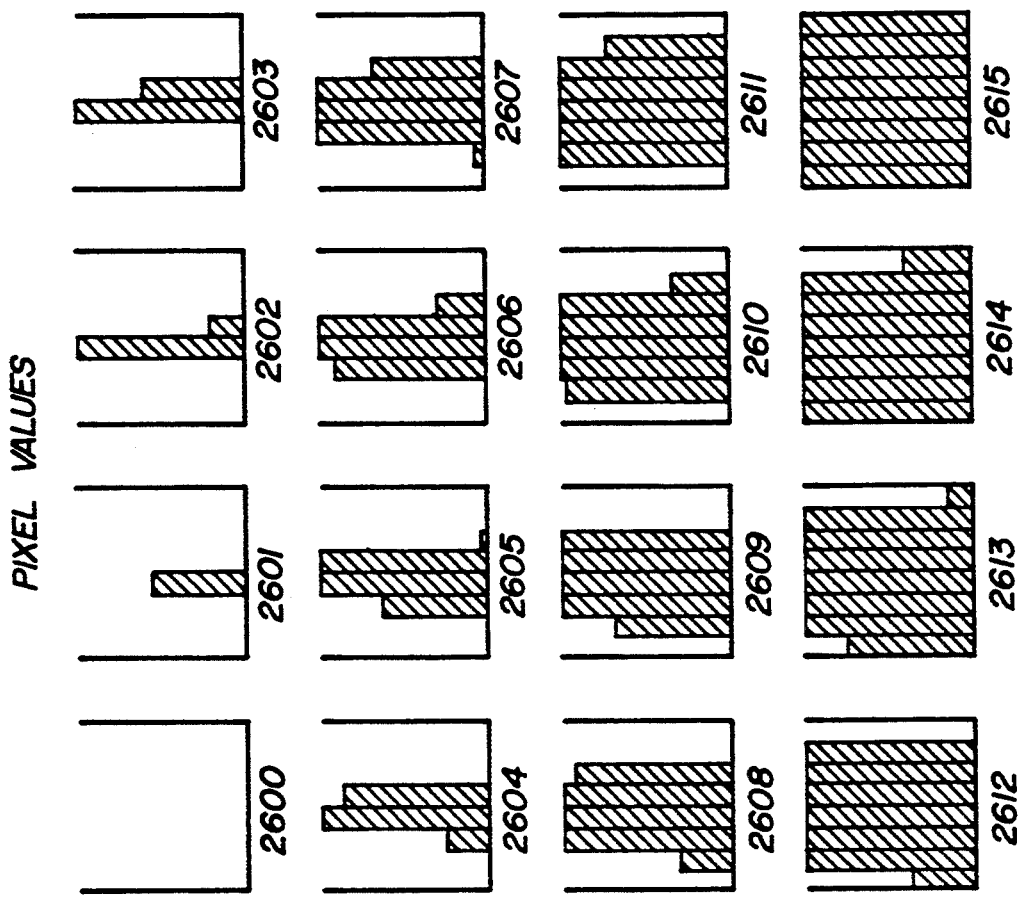
FIG. 26 depicts halftone cell pixel values that result from using the transfer functions shown in FIG. 24 in a halftoning system such as that shown in FIG. 2.
Figure 24:
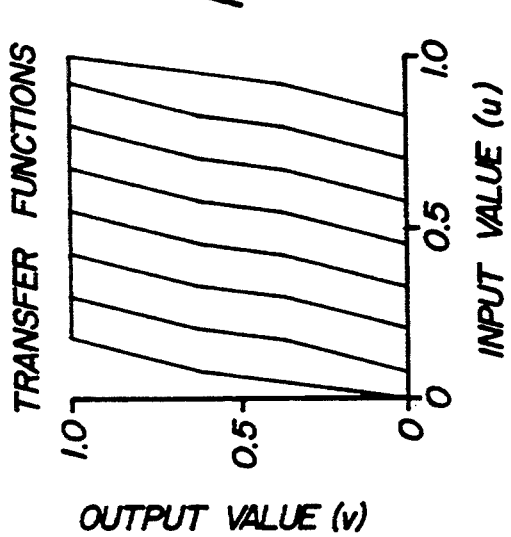
FIG. 24 depicts eight transfer functions generated by the process shown in FIG. 20 using variables $P=8$ and $t=0.6$.
Figure 25:
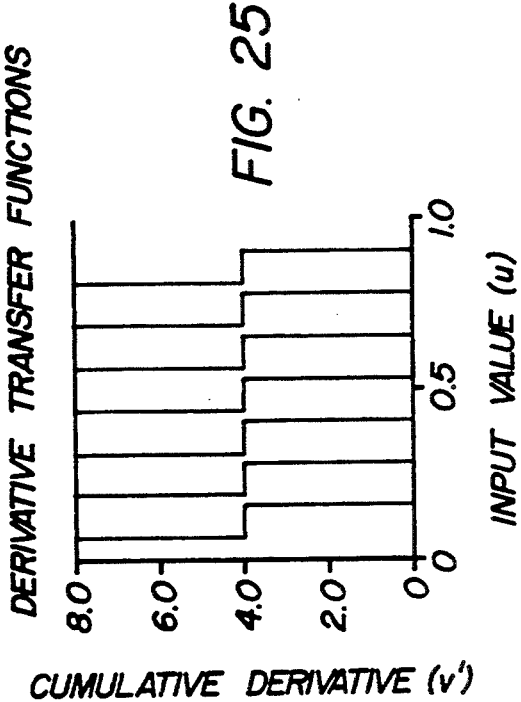
FIG. 25 depicts a graph of a summation of the derivatives of the transfer functions shown in FIG. 24.

FIG. 24 depicts a set of eight transfer functions generated by the inventive process when P=8 and t=0.6. The cumulative derivative of the eight transfer functions is depicted in FIG. 25. Additionally, FIG. 26 depicts the output from the eight transfer functions as an input intensity value for each transfer function is increased uniformly while the preference matrix addresses the transfer functions in the same clustered dot pattern used to generate the output values shown in FIG. 23. Comparing graph 2302 shown in FIG. 23 to graph 2602 shown in FIG. 26, shows that a non-zero output value is generated by element 5 addressing transfer function 2 prior to the output value generated by element 4 addressing transfer function 1 reaching a maximum value. Thus, it is apparent that as the texture t is decreased from 1, the output values increase more uniformly, i.e., less modulation is evident.

Figure 29:
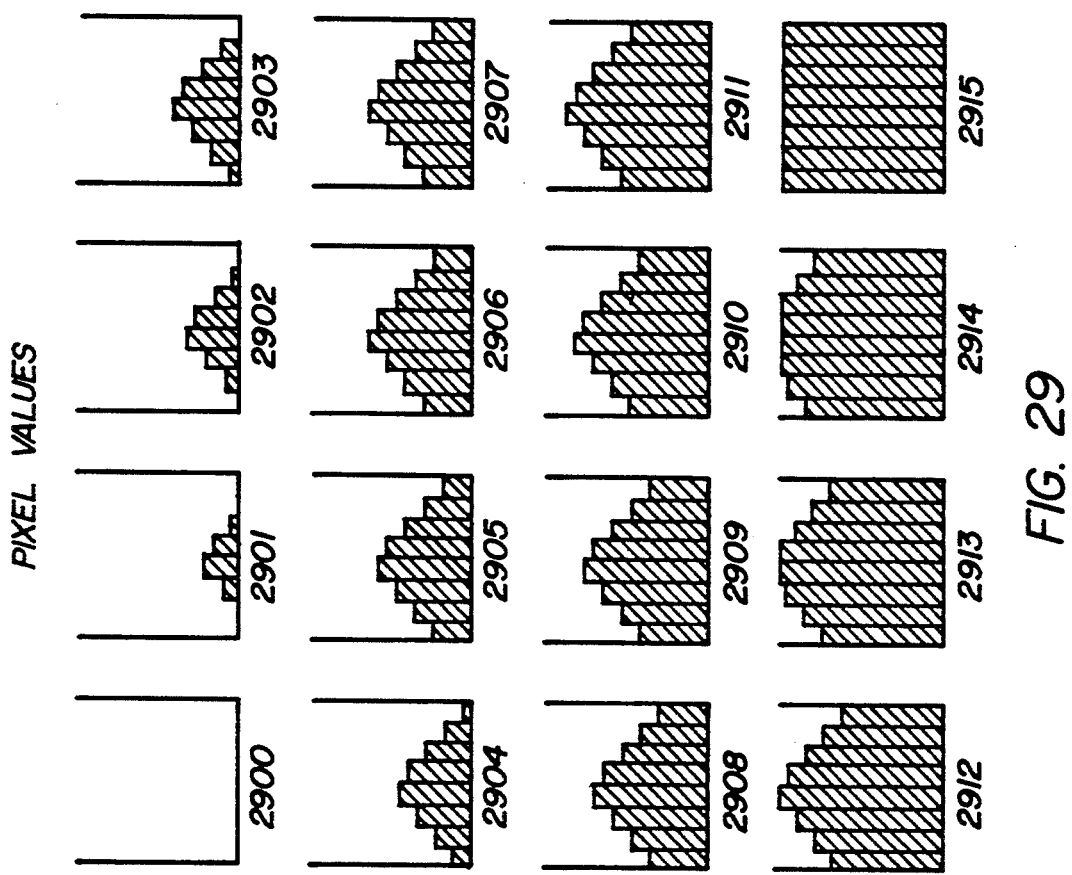
FIG. 29 depicts halftone cell pixel values that result from using the transfer functions shown in FIG. 27 in a halftoning system such as that shown in FIG. 2.
Figure 27:
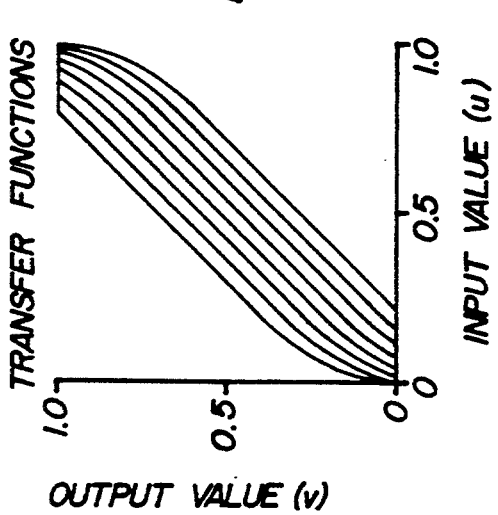
FIG. 27 depicts eight transfer functions generated by the process shown in FIG. 20 using variables $P=8$ and $t=0.06$.
Figure 28:
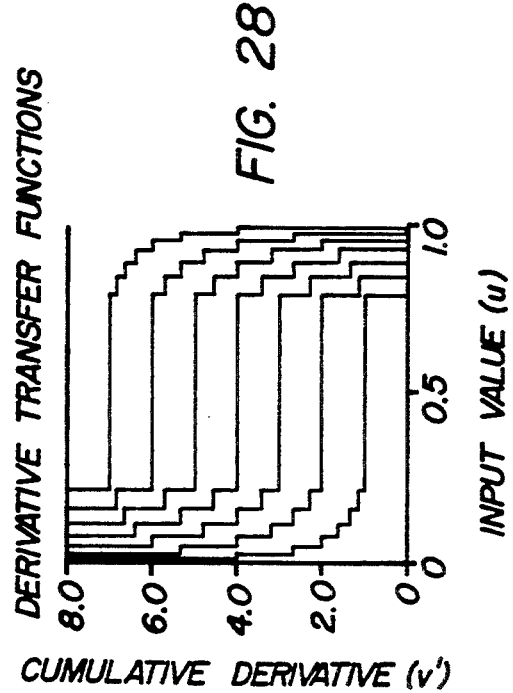
FIG. 28 depicts a graph of a summation of the derivatives of the transfer functions shown in FIG. 27.

FIG. 27 depicts a set of eight transfer functions generated by the process when P=8 and t=0.06. The cumulative derivative of the eight transfer functions is depicted in FIG. 28. Additionally, FIG. 29 depicts the output from the eight transfer functions as the input intensity values for each transfer function are increased uniformly while the preference matrix addresses the transfer functions in the same clustered dot pattern used to generate the output values shown in FIGS. 23 and 26. Comparing FIG. 26 to FIG. 29, explicitly shows that when a lower texture is used, increased uniformity is achieved between the rising output values as the input intensity values are uniformly increased in magnitude.

In accordance with the present invention as described above, a set of transfer functions having a controlled modulation characteristic are automatically generated using the inventive process. By subsequently quantizing the transfer functions and storing the quantized values as modulation levels in a look-up table, a halftoning system having accurately and controllably generated modulation values is created.

Alternatively, the process of the present invention can be used to generate the modulation levels, i.e., threshold levels, for the modulation matrix elements in conventional multi-level halftone systems. To generate these modulation levels, the transfer functions generated by the inventive process are sampled into $L_x+1$ increments, i.e., the number of intensity value levels, and quantized onto $L_y+1$ output levels. Subsequently, each input intensity value at which the output level of a quantized transfer function changes from level n to n+1 is selected as a modulation level. These modulation levels are loaded into the modulation level matrices in ascending order at identical element locations in each matrix.

Although several embodiments of the present invention have been shown and described in detail herein, many other varied embodiments that still incorporate the teachings of the present invention may be easily constructed by those skilled in the art.

We claim:

1. In a multi-level halftoning system, apparatus for generating a multi-level pixel value for a halftone cell from a magnitude of an intensity value, said apparatus comprising:

means, responsive to the magnitude of said intensity value, for producing a modulation level as said multi-level pixel value, wherein said producing means comprises a plurality of look-up tables each having values representing a pre-defined transfer function, wherein said pre-defined transfer functions are generated by apparatus comprising:

means for automatically producing said transfer functions using a mean-preserving process such that a sum of the derivative of said transfer functions equals the number of pixel values in said halftone cell;

preference matrix means connected to said producing means, for selecting one of said plurality of look-up tables; and means, connected to said selecting means, for controlling said selection such that one look-up table is selected in a pre-defined manner to produce a modulation level as said multi-level pixel value.

2. The apparatus of claim 1 wherein each said transfer function is quantized into a plurality of levels, whereby each quantization level is a modulation level.

3. The apparatus of claim 1 wherein said halftone cell comprises a plurality of multi-level pixel values and wherein said controlling means further comprises means for generating a plurality of multi-level pixel values from said intensity value magnitude.

4. The apparatus of claim 3 wherein said generating means comprises means for repetitively controlling said selection by said preference matrix means of said plurality of look-up tables such that said intensity value magnitude is applied to each selected look-up table to produce a plurality of modulation values as said multi-level pixel values in said halftone cell.

5. The apparatus of claim 1 wherein said preference matrix having a plurality of matrix elements defines a number of pixel locations in said halftone cell.

6. The apparatus of claim 1 wherein said means for producing said transfer functions comprises means for generating knot points defining said transfer functions in a piece-wise linear fashion.

7. In a multi-level halftoning system, a method for generating a multi-level pixel value for a halftone cell from an intensity value having a magnitude, said method comprising the steps of:

generating a plurality of pre-defined transfer functions wherein a sum of the derivative of said transfer functions equals a number of pixel values in said halftone cell;

selecting one of a plurality of look-up tables, wherein each said look-up table contains values representing one of said pre-defined transfer functions;

controlling said selection such that one look-up table is selected in a pre-defined manner; and producing, in response to the magnitude of said intensity value, a modulation level as said multi-level pixel value.

8. The method of claim 7 wherein each said transfer function is quantized into a plurality of levels, whereby each quantization level is a modulation level.

9. The method of claim 7 wherein said halftone cell comprises a plurality of multi-level pixel values and wherein said method further comprises the step of generating a plurality of multi-level pixel values from said intensity value magnitude.

10. The method of claim 9 wherein said generating step further comprises the step of repetitively controlling said look-up table selection such that the intensity value magnitude is applied to each selected look-up table to produce a plurality of modulation levels as said multi-level pixel values in said halftone cell.

11. The method of claim 7 wherein said step of generating said transfer functions further comprises the step of generating knot points defining said transfer functions in a piece-wise linear fashion.

12. In a multi-level halftoning system for converting an input intensity value into a multi-level pixel value for a halftone cell, apparatus for specifying matrix values used as modulation levels for converting said intensity value comprising:

means for generating a plurality of transfer functions being mean preserving such that a sum of the derivatives of said transfer functions equals a number of pixel values in said halftone cell; and means for specifying modulation levels from said mean preserving transfer functions.

13. The apparatus of claim 12 wherein said specifying means further comprises:

means for quantizing each said transfer function into a plurality of quantization levels wherein each quantization level is a modulation level; and means for storing said modulation levels as look-up table values.

14. The apparatus of claim 12 wherein said specifying means further comprises:

means for quantizing each said transfer function into a plurality of quantization levels;

means for defining a plurality of modulation levels by comparing said quantization levels to an intensity value that is increasing in value, each intensity value at which an output from said transfer function changes levels is a modulation level; and means for storing said modulation levels as modulation level matrix elements.

15. The apparatus of claim 12 wherein said transfers function generating means generates a plurality of transfer functions corresponding to a number of pixels in a halftone cell.

16. In a multi-level halftoning system having a predetermined number of micro-output levels available in the system, a method for generating a multi-level pixel value for a halftone cell, wherein said halftone cell has a predetermined cell size, from an intensity value having a given magnitude, comprising the steps of:

a. generating a plurality of pre-defined transfer functions wherein the sum of the derivative of said transfer function equals a number of pixel values in said halftone cell and further wherein each transfer function is quantized into a plurality of modulation levels determined as a function of the size of the halftone cell and the number of micro-output levels available in the system; and b. assigning said modulation levels as threshold matrix entries in a set of modulation level matrices.

17. A method as set forth in claim 16 wherein said step of assigning is performed by loading said modulation levels into said set of modulation level matrices in ascending order at identical locations in each matrix.

18. In a multi-level halftoning system for converting an input intensity value into a multi-level pixel value for a halftone cell, a method for specifying matrix values used as modulation levels for converting said intensity value, comprising the steps of:

a. generating a plurality of transfer functions being mean preserving such that the sum of the derivatives of said transfer functions equals a number of pixel values in said halftone cell; and b. specifying modulation levels from said mean preserving transfer functions.

19. A method as set forth in claim 18 wherein said step of specifying further comprises the steps of:

a. quantizing each said transfer function into a plurality of quantization levels wherein each quantization level is a modulation level; and b. storing said modulation levels as matrix entries.

20. A method as set forth in claim 19 wherein said step of storing is performed by loading said modulation levels into said set of modulation level matrices in ascending order at identical locations in each matrix.

21. A method as set forth in claim 18 wherein said step of specifying further comprises the steps of:

a. quantizing each said transfer function into a plurality of quantization levels;

b. defining a plurality of quantization levels by comparing said quantization levels to an intensity value that is increasing in value, where each intensity value at which an output from said transfer function changes level is a modulation level; and c. storing said modulation levels as modulation level matrix elements.

22. A method as set forth in claim 18 wherein said step of generating is operative to generate a plurality of transfer functions corresponding to a number of pixels in a halftone cell.

* * * * *